(12) United States Patent
Lyu et al.

(10) Patent No.: US 9,781,702 B2
(45) Date of Patent: Oct. 3, 2017

(54) DATA TRANSMISSION METHOD, USER EQUIPMENT, BASE STATION, AND SYSTEM TO RESOLVE A WASTE OF RESOURCES DURING AN M2M PROCESS

(71) Applicant: Huawei Technologies Co., Ltd., Shenzhen (CN)

(72) Inventors: Yongxia Lyu, Beijing (CN); Tong Ji, Beijing (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 14/860,257

(22) Filed: Sep. 21, 2015

(65) Prior Publication Data
US 2016/0014723 A1    Jan. 14, 2016

Related U.S. Application Data

(63) Continuation of application No. PCT/CN2013/073083, filed on Mar. 22, 2013.

(51) Int. Cl.
*H04W 72/04* (2009.01)
*H04W 72/02* (2009.01)
(Continued)

(52) U.S. Cl.
CPC .......... *H04W 72/02* (2013.01); *H04L 5/0005* (2013.01); *H04W 4/005* (2013.01)

(58) Field of Classification Search
CPC . H04L 27/2602; H04L 5/0007; H04L 1/0065; H04L 27/2647; H04L 27/26;
(Continued)

(56) References Cited

U.S. PATENT DOCUMENTS 7,230,941 B2 *    6/2007  Odenwalder ........... H04L 1/003
                                                      370/342
8,374,139 B2 *    2/2013  Chang ................... H04L 5/0053
                                                      370/328
(Continued)

FOREIGN PATENT DOCUMENTS

CN         102143532 A     8/2011
CN         102202412 A     9/2011
(Continued)

OTHER PUBLICATIONS

Huawei, "Non-Synchronized Random Access Procedure", 3GPP TSG RAN WG1 LTE Ad Hoc, R1-061856, Jun. 7-30, 2006, 3 pages, France.

(Continued)

*Primary Examiner* — Sai Aung
(74) *Attorney, Agent, or Firm* — Slater Matsil, LLP

(57) ABSTRACT

The present invention relates to the field of communications technologies, and discloses a data transmission method, user equipment, a base station, and a system. The method includes: selecting, by user equipment (UE), a preamble sequence, and acquiring an uplink time-frequency resource and a downlink time-frequency resource that are corresponding to the preamble sequence; sending the preamble sequence to a base station, so that the base station decodes the preamble sequence, and determines, according to the decoded preamble sequence, the uplink time-frequency resource and the downlink time-frequency resource that are corresponding to the decoded preamble sequence.

19 Claims, 9 Drawing Sheets

(51) Int. Cl.
*H04L 5/00* (2006.01)
*H04W 4/00* (2009.01)

(58) Field of Classification Search
CPC .. H04L 27/2613; H04L 1/1635; H04W 24/02; H04W 72/04; H04W 72/042; H04W 52/42
See application file for complete search history.

(56) References Cited

U.S. PATENT DOCUMENTS

| | | | |
|---|---|---|---|
| 2007/0041348 A1* | 2/2007 | Kwun | H04B 1/70735 370/335 |
| 2008/0002660 A1* | 1/2008 | Jeong | H04B 7/2681 370/350 |
| 2011/0299492 A1 | 12/2011 | Lee et al. | |
| 2013/0077484 A1 | 3/2013 | Zhao et al. | |
| 2015/0023244 A1 | 1/2015 | Shaheen et al. | |

FOREIGN PATENT DOCUMENTS

| | | |
|---|---|---|
| CN | 102387495 A | 3/2012 |
| CN | 102804882 A | 11/2012 |
| EP | 2398294 A2 | 12/2011 |
| WO | 2012131654 A1 | 10/2012 |

OTHER PUBLICATIONS

LTE, "3rd Generation Partnership Project; Technical Specification Group Radio Access Network; Evolved Universal Terrestrial Radio Access (E-UTRA); Multiplexing and Channel Coding (Release 8)," 3GPP TS 36.212 v8.6.0, Mar. 2009, 45 pages.

* cited by examiner ly, to a data transmission
DATA TRANSMISSION METHOD, USER EQUIPMENT, BASE STATION, AND SYSTEM TO RESOLVE A WASTE OF RESOURCES DURING AN M2M PROCESS This application is a continuation of International Application No. PCT/CN 2013/073083, filed on Mar. 22, 2013, which is hereby incorporated by reference in its entirety.

TECHNICAL FIELD

The present invention relates to the field of communications technologies, and in particular, to a data transmission method, user equipment, a base station, and a system.

BACKGROUND

As informatization deepens, machine to machine (M2M) information transmission is implemented by using a network, which has an advantage of real-time performance over manual data collection.

In the prior art, a process of LTE-based M2M information transmission is based on a connection, and includes two processes, that is, a random access process and a data transmission process. The random access process includes the following four steps: 1. User equipment (UE) sends a preamble sequence to a base station. 2. The base station sends a random access response (RAR). 3. The base station establishes a synchronous connection with the UE. 4. The base station resolves a conflict that a same preamble sequence corresponds to multiple UEs, and sends a conflict resolution message to the UE.

During implementation of the foregoing data transmission process, the inventors find that the prior art has at least the following problem: M2M information transmission is characterized by a small data volume and many times of data transmission. Because signaling overheads during the random access process do not change, when a data volume of a data packet comparatively decreases, a proportion of the signaling overheads increases during an information transmission process, which results in a waste of resources. For example, when an M2M data packet is transmitted, signaling overheads are 10 bit and a size of the M2M data packet is 10 bit, and a proportion of the signaling overheads to the size of the M2M data packet is 1:1; and when a common data packet such as a data packet of an SMS message is transmitted, signaling overheads are still 10 bit, a size of the data packet of the SMS message is 10 kb, and a proportion of the signaling overheads to the size of the data packet of the SMS message is 1:1024. For the same signaling overheads of 10 bit, compared with 1 kb of the data packet of the SMS message, with respect to sending of a data packet, 1 bit of the M2M data packet has the following problem: the signaling overheads are large and the sent data packet is small, which results in a waste of resources.

SUMMARY

A data transmission method, user equipment, a base station, and a system that are provided in the present invention can resolve a problem of a waste of resources during an M2M data transmission process.

According to a first aspect, the present invention provides a data transmission method, where the method includes: selecting, by user equipment UE, a preamble sequence, and acquiring an uplink time-frequency resource and a downlink time-frequency resource that are corresponding to the preamble sequence; sending the preamble sequence to a base station, so that the base station decodes the preamble sequence, and determines, according to the decoded preamble sequence, the uplink time-frequency resource and the downlink time-frequency resource that are corresponding to the decoded preamble sequence; and if decoding response information sent from the base station is received by using the downlink time-frequency resource, sending a data packet to the base station by using the uplink time-frequency resource, where the decoding response information is used to indicate that the base station successfully decodes the preamble sequence.

In a first possible implementation manner of the first aspect, the acquiring an uplink time-frequency resource corresponding to the preamble sequence includes: acquiring, from a pre-stored first correspondence set, the uplink time-frequency resource corresponding to the preamble sequence, where the first correspondence set is used to indicate a correspondence between at least one preamble sequence and an uplink time-frequency resource; or acquiring, from the first correspondence set sent from the base station, the uplink time-frequency resource corresponding to the preamble sequence; and the acquiring a downlink time-frequency resource corresponding to the preamble sequence includes: acquiring, from a pre-stored second correspondence set, the downlink time-frequency resource corresponding to the preamble sequence, where the second correspondence set is used to indicate a correspondence between at least one preamble sequence and a downlink time-frequency resource.

In the first aspect or the first possible implementation manner of the first aspect, a second possible implementation manner of the first aspect is further provided. In the second possible implementation manner of the first aspect, after the sending the preamble sequence to a base station, the method further includes: if the decoding response information sent from the base station is not received within first preset duration by using the downlink time-frequency resource, reselecting, by the UE, a preamble sequence after second preset duration, and acquiring an uplink time-frequency resource and a downlink time-frequency resource that are corresponding to the preamble sequence; and sending the preamble sequence to the base station, so that the base station decodes the preamble sequence, and determines, according to the decoded preamble sequence, the uplink time-frequency resource and the downlink time-frequency resource that are corresponding to the decoded preamble sequence.

In the first aspect or the first possible or second possible implementation manner of the first aspect, a third possible implementation manner of the first aspect is further provided. In the third possible implementation manner of the first aspect, after the sending a data packet to the base station by using the uplink time-frequency resource corresponding to the preamble sequence, the method further includes: if acknowledgement information sent from the base station is not received within third preset duration, reselecting, by the UE, a preamble sequence after fourth preset duration, and acquiring an uplink time-frequency resource and a downlink time-frequency resource that are corresponding to the preamble sequence; and sending the preamble sequence to the base station, so that the base station decodes the preamble sequence, and determines, according to the decoded preamble sequence, the uplink time-frequency resource and the downlink time-frequency resource that are corresponding to the decoded preamble sequence, where the acknowledgement information is used to indicate that the base station already successfully receives the data packet sent by the UE.

According to a second aspect, the present invention further provides a data transmission method, including: receiving, by a base station, a preamble sequence sent by user equipment UE; decoding the preamble sequence; and if the decoding succeeds, determining, according to the decoded preamble sequence, an uplink time-frequency resource and a downlink time-frequency resource that are corresponding to the decoded preamble sequence; sending decoding response information to the UE by using the downlink time-frequency resource, where the decoding response information is used to indicate that the base station successfully decodes the preamble sequence; and receiving, by using the uplink time-frequency resource, a data packet sent by the UE.

In a first possible implementation manner of the second aspect, before the receiving, by a base station, a preamble sequence sent by UE, the method further includes: sending a first correspondence set to the UE, where the first correspondence set is used to indicate a correspondence between at least one preamble sequence and an uplink time-frequency resource, so that the UE determines the uplink time-frequency resource according to the first correspondence set.

In the second aspect or the first possible implementation manner of the second aspect, a second possible implementation manner of the second aspect is further provided. In the second possible implementation manner of the second aspect, after the receiving, by using the uplink time-frequency resource, a data packet sent by the UE, the method further includes: if the data packet is successfully received, sending acknowledgement information to the UE, where the acknowledgement information is used to indicate that the base station already successfully receives the data packet.

According to a third aspect, the present invention further provides user equipment UE, including: a selection unit, configured to select a preamble sequence; an acquiring unit, configured to acquire, according to a correspondence set and the preamble sequence that is selected by the selection unit, an uplink time-frequency resource and a downlink time-frequency resource that are corresponding to the preamble sequence; a sending unit, configured to send the preamble sequence selected by the selection unit to a base station, so that the base station decodes the preamble sequence, and determines, according to the decoded preamble sequence, the uplink time-frequency resource and the downlink time-frequency resource that are corresponding to the decoded preamble sequence; and a receiving unit, configured to receive, by using the downlink time-frequency resource, decoding response information sent from the base station, where the sending unit is further configured to: when the receiving unit receives the decoding response information sent from the base station, send a data packet to the base station by using the uplink time-frequency resource, where the decoding response information is used to indicate that the base station successfully decodes the preamble sequence.

In a first possible implementation manner of the third aspect, the UE further includes: a storage unit, configured to store sets of correspondences between the preamble sequence and the uplink time-frequency resource and between the preamble sequence and the downlink time-frequency resource, and a preamble sequence set, where the storage unit is further configured to pre-store a first correspondence set, where the first correspondence set is used to indicate a correspondence between at least one preamble sequence and an uplink time-frequency resource; the acquiring unit is further configured to acquire, from the first correspondence set pre-stored by the storage unit, the uplink time-frequency resource corresponding to the preamble sequence; the receiving unit is further configured to receive the first correspondence set sent from the base station; the acquiring unit is further configured to acquire, from the first correspondence set received by the receiving unit, the uplink time-frequency resource corresponding to the preamble sequence; the storage unit is further configured to pre-store a second correspondence set, where the second correspondence set is used to indicate a correspondence between at least one preamble sequence and a downlink time-frequency resource; and the acquiring unit is further configured to acquire, from the second correspondence set pre-stored by the storage unit, the downlink time-frequency resource corresponding to the preamble sequence.

In the third aspect or the first possible implementation manner of the third aspect, a second possible implementation manner of the third aspect is further provided. In the second possible implementation manner of the third aspect, the selection unit is further configured to: when the receiving unit has not received, within first preset duration by using the downlink time-frequency resource corresponding to the preamble sequence, the decoding response information sent from the base station, reselect a preamble sequence after second preset duration.

In the third aspect or the first possible or second possible implementation manner of the third aspect, a third possible implementation manner of the third aspect is further provided. In the third possible implementation manner of the third aspect, the receiving unit is further configured to receive acknowledgement information sent from the base station, where the acknowledgement information is used to indicate that the base station already successfully receives the data packet sent by the sending unit; and the selection unit is further configured to: when the receiving unit has not received, within third preset duration, the acknowledgement information sent from the base station, reselect a preamble sequence after fourth preset duration.

According to a fourth aspect, the present invention further provides a base station, including: a receiving unit, configured to receive a preamble sequence sent by user equipment UE; a decoding unit, configured to decode the preamble sequence received by the receiving unit; a determining unit, configured to: when decoding by the decoding unit succeeds, determine, according to the decoded preamble sequence obtained by the decoding unit and a correspondence set stored by a storage unit, an uplink time-frequency resource and a downlink time-frequency resource that are corresponding to the decoded preamble sequence; and a sending unit, configured to send decoding response information to the UE according to the downlink time-frequency resource determined by the determining unit, where the decoding response information is used to indicate that the decoding unit successfully decodes the preamble sequence, where the receiving unit is further configured to receive, by using the uplink time-frequency resource determined by the determining unit, a data packet sent by the UE.

In a first possible implementation manner of the fourth aspect, the base station further includes a storage unit, configured to store sets of correspondences between the preamble sequence and the uplink time-frequency resource and between the preamble sequence and the downlink time-frequency resource, and a preamble sequence set.

In the fourth aspect or the first possible implementation manner of the fourth aspect, a second possible implementation manner of the fourth aspect is further provided. In the second possible implementation manner of the fourth aspect, the sending unit is further configured to send a first correspondence set to the UE, where the first correspondence set is used to indicate a correspondence between at least one preamble sequence and an uplink time-frequency resource, so that the UE determines the uplink time-frequency resource according to the first correspondence set.

In the fourth aspect or the first possible or second possible implementation manner of the fourth aspect, a third possible implementation manner of the fourth aspect is further provided. In the third possible implementation manner of the fourth aspect, the sending unit is further configured to send acknowledgement information to the UE when the receiving unit successfully receives the data packet, where the acknowledgement information is used to indicate that the receiving unit already successfully receives the data packet.

According to a fifth aspect, the present invention further provides a data transmission system, including user equipment UE and a base station, where the UE is configured to select a preamble sequence, and acquire an uplink time-frequency resource and a downlink time-frequency resource that are corresponding to the preamble sequence; and send the preamble sequence to the base station; the base station is configured to receive the preamble sequence sent by the user equipment UE; decode the preamble sequence; if the decoding succeeds, determine, according to the decoded preamble sequence, the uplink time-frequency resource and the downlink time-frequency resource that are corresponding to the decoded preamble sequence; and send decoding response information to the UE by using the downlink time-frequency resource, where the decoding response information is used to indicate that the base station successfully decodes the preamble sequence; the UE is further configured to: when the decoding response information sent from the base station is received by using the downlink time-frequency resource, send a data packet to the base station by using the uplink time-frequency resource corresponding to the preamble sequence; and the base station is further configured to receive, by using the uplink time-frequency resource, the data packet sent by the UE.

According to a sixth aspect, the present invention further includes user equipment UE, including: a processor, configured to select a preamble sequence from a preamble sequence set, and acquire, according to a correspondence set and the selected preamble sequence, an uplink time-frequency resource and a downlink time-frequency resource that are corresponding to the preamble sequence; a transmitter, configured to send the preamble sequence acquired by the processor to a base station, so that the base station decodes the preamble sequence, and determines, according to the decoded preamble sequence, the uplink time-frequency resource and the downlink time-frequency resource that are corresponding to the decoded preamble sequence; and a receiver, configured to receive, by using the downlink time-frequency resource, decoding response information sent from the base station, where the decoding response information is used to indicate that the base station successfully decodes the preamble sequence, where the transmitter is further configured to: when the receiver receives the decoding response information sent from the base station, send a data packet to the base station by using the uplink time-frequency resource corresponding to the preamble sequence.

In a first possible implementation manner of the sixth aspect, the UE further includes: a memory, configured to store sets of correspondences between the preamble sequence and the uplink time-frequency resource and between the preamble sequence and the downlink time-frequency resource, and a preamble sequence set, where the memory is further configured to pre-store a first correspondence set, where the first correspondence set is used to indicate a correspondence between at least one preamble sequence and an uplink time-frequency resource; the processor is further configured to acquire, from the first correspondence set pre-stored by the memory, the uplink time-frequency resource corresponding to the preamble sequence; the receiver is further configured to receive the first correspondence set sent from the base station; the processor is further configured to acquire, from the first correspondence set received by the receiver, the uplink time-frequency resource corresponding to the preamble sequence; the memory is further configured to pre-store a second correspondence set, where the second correspondence set is used to indicate a correspondence between at least one preamble sequence and a downlink time-frequency resource; and the processor is further configured to acquire, from the second correspondence set pre-stored by the memory, the downlink time-frequency resource corresponding to the preamble sequence.

In the sixth aspect or the first possible implementation manner of the sixth aspect, a second possible implementation manner of the sixth aspect is further provided. In the second possible implementation manner of the sixth aspect, the processor is further configured to: when the receiver has not received, within first preset duration by using the downlink time-frequency resource corresponding to the preamble sequence, the decoding response information sent from the base station, reselect a preamble sequence after second preset duration.

In the sixth aspect or the first possible or second possible implementation manner of the sixth aspect, a third possible implementation manner of the sixth aspect is further provided. In the third possible implementation manner of the sixth aspect, the receiver is further configured to receive acknowledgement information sent from the base station, where the acknowledgement information is used to indicate that the base station already successfully receives the data packet sent by the UE; and the processor is further configured to: when the receiver has not received, within third preset duration, the acknowledgement information sent from the base station, reselect a preamble sequence after fourth preset duration.

According to a seventh aspect, the present invention further provides a base station, including: a receiver, configured to receive a preamble sequence sent by user equipment UE; a processor, configured to decode the preamble sequence received by the receiver; and when the decoding succeeds, determine, according to the decoded preamble sequence and a correspondence set, an uplink time-frequency resource and a downlink time-frequency resource that are corresponding to the decoded preamble sequence; and a transmitter, configured to send decoding response information to the UE according to the downlink time-frequency resource determined by the processor, where the decoding response information is used to indicate that the base station successfully decodes the preamble sequence, where the receiver is further configured to receive, by using the uplink time-frequency resource determined by the processor, a data packet sent by the UE.

In a first possible implementation manner of the seventh aspect, the base station further includes a memory, configured to store sets of correspondences between the preamble sequence and the uplink time-frequency resource and between the preamble sequence and the downlink time-frequency resource, and a preamble sequence set.

In the seventh aspect or the first possible implementation manner of the seventh aspect, a second possible implementation manner of the seventh aspect is further provided. In the second possible implementation manner of the seventh aspect, the transmitter is further configured to send a first correspondence set to the UE, where the first correspondence set is used to indicate a correspondence between at least one preamble sequence and an uplink time-frequency resource, so that the UE determines the uplink time-frequency resource according to the first correspondence set.

In the seventh aspect or the first possible or second possible implementation manner of the seventh aspect, a third possible implementation manner of the seventh aspect is further provided. In the third possible implementation manner of the seventh aspect, the transmitter is further configured to send acknowledgement information to the UE when the receiver successfully receives the data packet, where the acknowledgement information is used to indicate that the base station already successfully receives the data packet.

According to an eighth aspect, the present invention further provides a data transmission system, including user equipment UE and a base station, where the UE is configured to select a preamble sequence, and acquire an uplink time-frequency resource and a downlink time-frequency resource that are corresponding to the preamble sequence; and send the preamble sequence to the base station; the base station is configured to receive the preamble sequence sent by the user equipment UE; decode the preamble sequence; if the decoding succeeds, determine, according to the decoded preamble sequence, the uplink time-frequency resource and the downlink time-frequency resource that are corresponding to the decoded preamble sequence; and send decoding response information to the UE by using the downlink time-frequency resource, where the decoding response information is used to indicate that the base station successfully decodes the preamble sequence; the UE is further configured to: when the decoding response information sent from the base station is received by using the downlink time-frequency resource, send a data packet to the base station by using the uplink time-frequency resource corresponding to the preamble sequence; and the base station is further configured to receive, by using the uplink time-frequency resource, the data packet sent by the UE.

In the data transmission method, the UE, the base station, and the system that are provided in the present invention, the UE can acquire an uplink time-frequency resource and a downlink time-frequency resource that are corresponding to the preamble sequence, and if receiving, by using the downlink time-frequency resource, decoding response information sent from the base station, the UE sends a data packet to the base station by using the uplink time-frequency resource. In the prior art, the step of acquiring the time-frequency resources that are corresponding to the preamble sequence is implemented by the base station; the base station needs to send, to the UE in a random access response, a series of information about the time-frequency resources that are corresponding to the preamble sequence, and then the UE acquires the time-frequency resources, which increases a signaling amount. In addition, the UE needs to determine the uplink time-frequency resource and the downlink time-frequency resource according to the series of information sent from the base station. Further, in the prior art, the base station needs to perform synchronization and conflict resolution with the UE, and multiple pieces of signaling are generated in these two steps. In the present invention, the UE can acquire, without using the series of information sent from the base station, the uplink time-frequency resource and the downlink time-frequency resource that are corresponding to the preamble sequence, thereby achieving a technical effect of locally acquiring the uplink time-frequency resource and the downlink time-frequency resource that are corresponding to the preamble sequence. After receiving the decoding response information sent from the base station, the UE can directly perform data transmission according to the locally determined uplink time-frequency resource or downlink time-frequency resource, thereby avoiding signaling overheads during a random response process in the prior art. In addition, the UE can determine, according to the decoding response information sent from the base station, that the UE synchronizes with the base station and there is no conflict, thereby further reducing signaling overheads during a random access process and improving transmission efficiency.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the prior art, an M2M information transmission process in LTE is based on a connection, and includes two processes, that is, a random access process and a data uploading process. During the random access process, UE selects a preamble sequence and sends the preamble sequence to a base station, and the base station sends random access response information to the UE after receiving the preamble sequence, where the random access response information carries the preamble sequence, a cell radio network temporary identifier (C-RNTI), and an indication indicating a resource used by the UE to subsequently transmit uplink information. The UE sends, as instructed by an RAR, a connection request on an uplink channel corresponding to the resource indication, where the process request is used by the UE to establish a connection with the base station, for example, MSG3 (the so-called MSG3 is actually three messages; during the random access process, content of the messages is unfixed, and the messages may sometimes carry a Radio Resource Control protocol (RRC) connection request, and may sometimes carry some control messages or even service data packets; therefore, the three messages are briefly referred to as MSG3) is used to establish synchronization with the base station. After synchronization is established, the base station sends prompt information to the UE; and if a conflict occurs, the base station sends a conflict resolution message to the UE after the conflict is resolved. The UE may determine that random access is complete when receiving the conflict resolution message, and may subsequently send data through the uplink channel.

Figure 1:
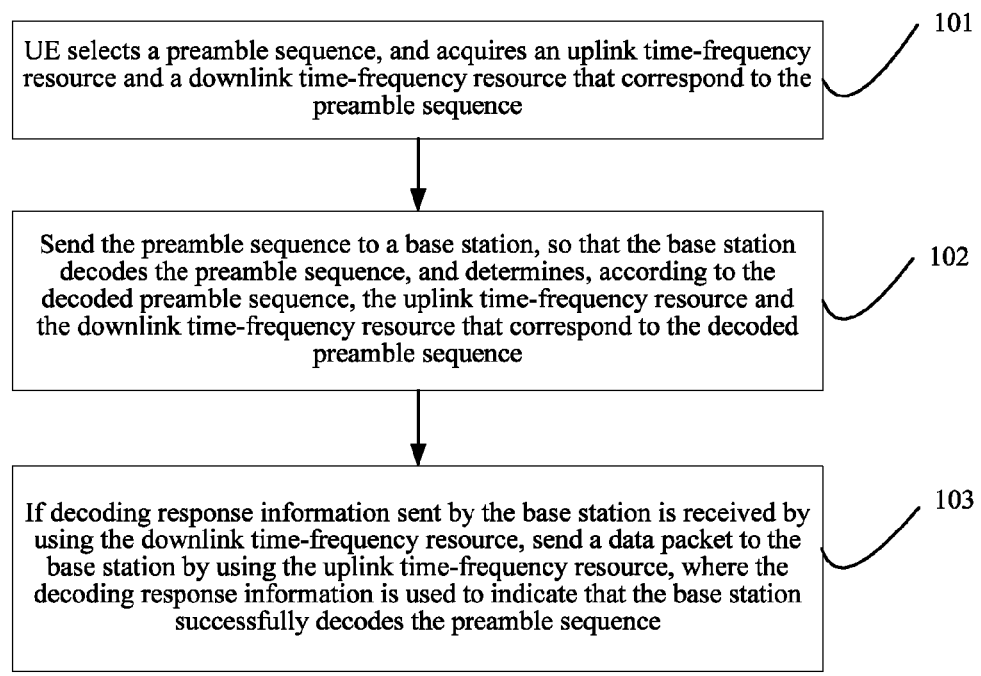
FIG. 1 is a flowchart of a first data transmission method according to an embodiment of the present invention.

An embodiment of the present invention provides a data transmission method. As shown in FIG. 1, the method includes the following steps.

Step 101: UE selects a preamble sequence, and acquires an uplink time-frequency resource and a downlink time-frequency resource that are corresponding to the preamble sequence.

Electronic devices corresponding to a base station are collectively referred to as the UE in this embodiment and the following embodiments of the present invention, and include a handheld device (for example, a mobile phone) of a user, an electronic device (for example, a household watt-hour meter, a water level detector, or a smoke alarm) that has a signal transmit apparatus and is configured to measure data, or the like. In the prior art, LTE sets 64 preamble sequences for each cell, where the preamble sequences are orthogonal to each other. In the present invention, less than 64 preamble sequences may be set according to a load situation of M2M data transmission of each cell, where the preamble sequences are still orthogonal to each other. However, because a quantity of the preamble sequences that need to keep orthogonal to each other decreases, a length of each preamble sequence shortens. Therefore, a data volume of the preamble sequences is reduced, and signaling overheads can be reduced.

An orthogonal frequency division multiplexing (OFDM) symbol, or a currently used preamble sequence in format 4 may be used as the preamble sequence.

A specific method of selecting a preamble sequence may be random selection, or may be sequential selection, and a specific selection manner is not limited herein.

The UE locally saves a set of a first correspondence between a preamble sequence and an uplink time-frequency resource, and a set of a second correspondence between a preamble sequence and a downlink time-frequency resource. The first correspondence set includes a correspondence between at least one preamble sequence and an uplink time-frequency resource, and the second correspondence set includes a correspondence between at least one preamble sequence and a downlink time-frequency resource. The uplink time-frequency resource and the downlink time-frequency resource that are corresponding to the preamble sequence can be acquired by searching the first correspondence set and the second correspondence set. The first correspondence set and the second correspondence set may be separately stored in different data tables, or may be stored in a same content store table. The unique uplink time-frequency resource and the unique downlink time-frequency resource that are corresponding to the preamble sequence can be found by using the preamble sequence as a keyword.

Step 102: Send the preamble sequence to a base station, so that the base station decodes the preamble sequence, and determines, according to the decoded preamble sequence, the uplink time-frequency resource and the downlink time-frequency resource that are corresponding to the decoded preamble sequence.

The preamble sequence selected in step 101 is sent to the base station, and the base station can determine, according to the preamble sequence, the uplink time-frequency resource and the downlink time-frequency resource that are corresponding to the decoded preamble sequence. The uplink time-frequency resource is used by the UE to upload a data packet to the base station, and the downlink time-frequency resource is used by the base station to send decoding response information to the UE. If multiple UEs simultaneously select a same preamble sequence and simultaneously send the preamble sequence to the base station, preamble sequence signals interfere with each other. As a result, strength of the preamble sequence signals decreases, and the base station cannot parse out the preamble sequence. The base station can determine, only after successfully decoding the preamble sequence, the uplink time-frequency resource and the downlink time-frequency resource that are corresponding to the decoded preamble sequence, and send the decoding response information to the UE by using the downlink time-frequency resource.

Step 103: If decoding response information sent from the base station is received by using the downlink time-frequency resource, send a data packet to the base station by using the uplink time-frequency resource, where the decoding response information is used to indicate that the base station successfully decodes the preamble sequence.

The decoding response information may be identifier information, or may be a combination of identifier information and a preamble sequence. For example, if identifier information is "1", the UE determines that the base station successfully decodes the preamble sequence. If the decoding response information is a combination of identifier information and a preamble sequence, in addition to determining whether the identifier information is "1", the UE further determines whether the received preamble sequence is the same as the preamble sequence sent by the UE; if the received preamble sequence is the same as the preamble sequence sent by the UE, and the identifier information is "1", the UE determines that the base station successfully decodes the preamble sequence. In addition, the decoding response information may further include time synchronization information, and the UE adjusts time setting of the UE according to the received time synchronization information, so as to synchronize with the base station in a time sequence.

If the decoding response information sent from the base station is received by using the downlink time-frequency resource corresponding to the preamble sequence, it indicates that the base station currently learns the uplink time-frequency resource used by the UE to upload data and the downlink time-frequency resource that waits for receiving, and waits, on the uplink time-frequency resource, for the data packet sent by the UE.

In the data transmission method provided in the present invention, UE can acquire an uplink time-frequency resource and a downlink time-frequency resource that are corresponding to a preamble sequence, and when receiving, by using the downlink time-frequency resource, decoding response information sent from a base station, the UE sends a data packet to the base station by using the uplink time-frequency resource. In the prior art, the step of acquiring the time-frequency resources that are corresponding to the preamble sequence is implemented by the base station; the base station needs to send, to the UE in a random access response, a series of information about the time-frequency resources that are corresponding to the preamble sequence, and then the UE acquires the time-frequency resources, which increases a signaling amount.

In addition, the UE needs to determine the uplink time-frequency resource and the downlink time-frequency resource according to the series of information sent from the base station. Further, in the prior art, the base station needs to perform synchronization and conflict resolution with the UE, and multiple pieces of signaling are generated in these two steps. In the present invention, the UE can acquire, without using the series of information sent from the base station, the uplink time-frequency resource and the downlink time-frequency resource that are corresponding to the preamble sequence, thereby achieving a technical effect of locally acquiring the uplink time-frequency resource and the downlink time-frequency resource that are corresponding to the preamble sequence. After receiving the decoding response information sent from the base station, the UE can directly perform data transmission according to the locally determined uplink time-frequency resource or downlink time-frequency resource, thereby avoiding signaling overheads during a random response process in the prior art. In addition, the UE can determine, according to the decoding response information sent from the base station, that the UE synchronizes with the base station and there is no conflict, thereby further reducing signaling overheads during a random access process and improving transmission efficiency.

An embodiment of the present invention further provides a data transmission method. This embodiment further describes step 101 in the embodiment shown in FIG. 1, where the acquiring an uplink time-frequency resource and a downlink time-frequency resource that are corresponding to the preamble sequence includes acquiring, from a pre-stored first correspondence set, the uplink time-frequency resource corresponding to the preamble sequence, where the first correspondence set is used to indicate a correspondence between at least one preamble sequence and an uplink time-frequency resource; or acquiring, from the first correspondence set sent from the base station, the uplink time-frequency resource corresponding to the preamble sequence.

In step 101, the acquiring a downlink time-frequency resource corresponding to the preamble sequence includes: acquiring, from a pre-stored second correspondence set, the downlink time-frequency resource corresponding to the preamble sequence, where the second correspondence set is used to indicate a correspondence between at least one preamble sequence and a downlink time-frequency resource.

The UE may obtain the first correspondence set in two manners: pre-storing the first correspondence set and receiving the first correspondence set sent from the base station. In the manner of sending the first correspondence set by the base station, the first correspondence set may be loaded in signaling. In addition to M2M communication, the base station is also responsible for other data transmission services such as voice call; therefore, the uplink time-frequency resource that is inside the base station and used by the UE for uploading may be fixed, or may be temporarily allocated by the base station. In the case in which the base station temporarily allocates the uplink time-frequency resource, after the first correspondence set is sent to the UE by means of signaling, the base station is enabled to dynamically adjust the uplink time-frequency resource that is inside the base station, so as to improve the resource usage efficiency of the base station. In addition, by copying, from a mobile device, the first correspondence set and the second correspondence set to the UE, that is, pre-storing the first correspondence set and the second correspondence set, network transmission does not need to be performed, which can reduce load of the base station.

In the data transmission method provided in this embodiment of the present invention, a first correspondence set and a second correspondence set can be acquired in a pre-storing manner without network transmission, and occupation of a channel of a base station is avoided during an acquiring process, which reduces load of the base station. In addition, the first correspondence set sent from the base station is received, and the base station is enabled to dynamically adjust an uplink time-frequency resource that is inside the base station, so as to improve the resource usage efficiency of the base station.

Figure 2:
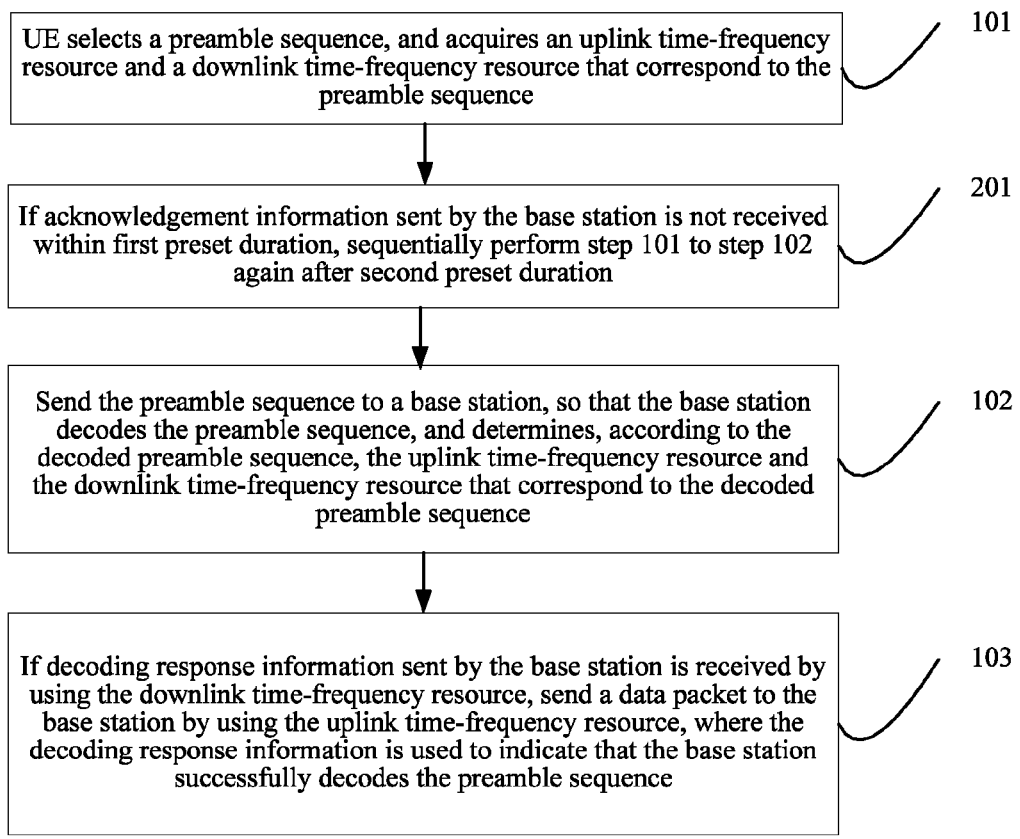
FIG. 2 is a flowchart of a second data transmission method according to an embodiment of the present invention.

An embodiment of the present invention further provides a data transmission method. As shown in FIG. 2, this embodiment is similar to the embodiment shown in FIG. 1, and a difference lies in that after step 101, the method further includes the following steps:

Step 201: If the decoding response information sent from the base station is not received within first preset duration by using the downlink time-frequency resource, the UE reselects a preamble sequence after second preset duration, and acquires an uplink time-frequency resource and a downlink time-frequency resource that are corresponding to the preamble sequence; and sends the preamble sequence to the base station, so that the base station decodes the preamble sequence and determines, according to the decoded preamble sequence, the uplink time-frequency resource and the downlink time-frequency resource that are corresponding to the decoded preamble sequence. That is, step 101 to step 102 are sequentially performed again.

If communication is normal, after the UE sends the preamble sequence, the base station can complete decoding of the preamble sequence within the first preset duration such as 4 ms, and send the decoding response information to the UE. If the UE has not received the decoding response information within the first preset duration by using the downlink time-frequency resource determined in step 101, another backoff window is generated; and step 101 is performed again after the second preset duration such as 50 ms, and step 101 to step 102 are sequentially performed. A length of a fourth preset time is the same as that of the backoff window.

In the another data transmission method provided in the present invention, it can be determined, according to a receiving state of decoding response information, whether to perform sending of a preamble sequence and a subsequent step again. That the UE blindly transmits a data packet by using an uplink time-frequency resource corresponding to the preamble sequence is avoided in a case in which the UE does not learn whether a base station successfully decodes a preamble sequence, thereby properly using a channel resource, and improving accuracy of data packet transmission.

Figure 3:
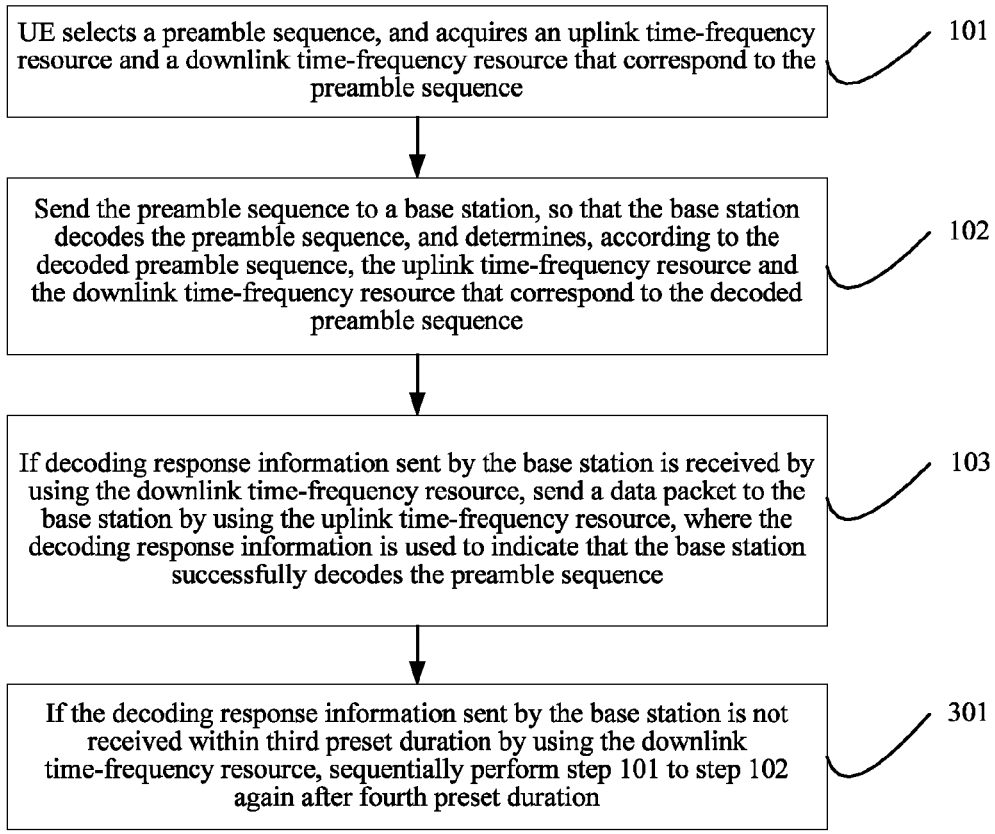
FIG. 3 is a flowchart of a third data transmission method according to an embodiment of the present invention.

An embodiment of the present invention further provides a data transmission method. As shown in FIG. 3, this embodiment is similar to the embodiment shown in FIG. 1, and a difference lies in that after step 103, the method further includes the following steps:

Step 301: If acknowledgement information sent from the base station is not received within third preset duration, the UE reselects a preamble sequence after fourth preset duration, and acquires an uplink time-frequency resource and a downlink time-frequency resource that are corresponding to the preamble sequence; and sends the preamble sequence to the base station, so that the base station decodes the preamble sequence and determines, according to the decoded preamble sequence, the uplink time-frequency resource and the downlink time-frequency resource that are corresponding to the decoded preamble sequence. That is, step 101 to step 102 are sequentially performed again.

The acknowledgement information is used to indicate that the base station already successfully receives the data packet sent by the UE.

If the acknowledgement information sent from the base station is received, the UE determines that the base station successfully receives the data packet.

If communication is normal, the base station sends the acknowledgement information to the UE within, for example, 12 ms (millisecond), that is, the third preset duration after the UE sends the preamble sequence. If the UE has not received the acknowledgement information, a backoff window is generated; and step 101 is performed again after the fourth preset duration such as 1 s, and step 101 to step 102 are sequentially performed. A length of a fourth preset time is the same as that of the backoff window.

In the data transmission method provided in this embodiment of the present invention, it can be determined, according to a receiving state of acknowledgement information, whether to perform sending of a preamble sequence and a subsequent step again. That the UE blindly transmits a data packet is avoided in a case in which the UE does not learn whether a data packet is successfully sent, thereby properly using an uplink time-frequency resource, and improving accuracy of data packet transmission.

An embodiment of the present invention further provides a data transmission method. This embodiment is similar to the embodiment shown in FIG. 1, and a difference lies in that the decoding response information received in step 102 further carries information about the uplink time-frequency resource used by the UE to send data. In this case, only the downlink time-frequency resource corresponding to the preamble sequence may need to be acquired in step 101; and the uplink time-frequency resource may be acquired in step 103 according to the decoding response information received in step 102, and the data packet is sent to the base station by using the uplink time-frequency resource. Only the second correspondence set is pre-stored before step 101. In this case, the uplink time-frequency resource used by the UE to send data no longer corresponds to the preamble sequence, but is dynamically acquired from the decoding response information received in step 102.

Figure 4:
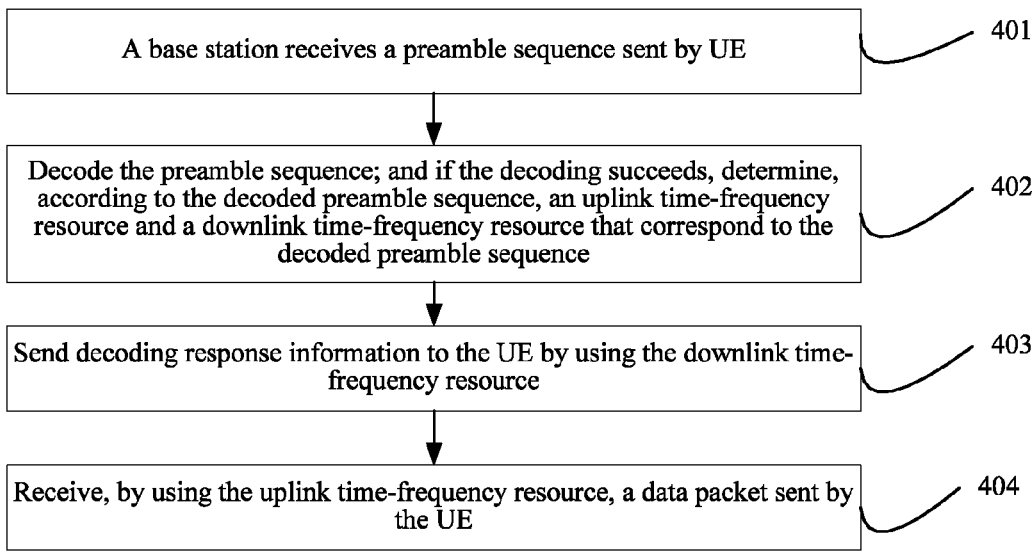
FIG. 4 is a flowchart of a fourth data transmission method according to an embodiment of the present invention.

An embodiment of the present invention further provides a data transmission method. As shown in FIG. 4, the method includes the following steps:

Step 401: A base station receives a preamble sequence sent by UE.

When the UE needs to transmit data, the UE selects the preamble sequence, and sends the preamble sequence to the base station.

Step 402: Decode the preamble sequence; and if the decoding succeeds, determine, according to the decoded preamble sequence, an uplink time-frequency resource and a downlink time-frequency resource that are corresponding to the decoded preamble sequence.

Because the base station saves a first correspondence set and a second correspondence set, the base station can determine, according to the received preamble sequence, the uplink time-frequency resource and the downlink time-frequency resource that are corresponding to the preamble sequence. The base station can determine whether information sent by the UE is a preamble sequence by identifying an identifier field of the information sent by the UE, and obtain the preamble sequence by parsing the received information, so as to complete decoding. If multiple UEs simultaneously select a same preamble sequence and simultaneously send the preamble sequence to the base station, because preamble sequences conflict with each other and interfere the base station, the information sent by the UE cannot be identified, and decoding fails. When decoding fails, the base station waits for the UE to resend data, so as to decode the preamble sequence again.

Step 403: Send decoding response information to the UE by using the downlink time-frequency resource.

The decoding response information is used to indicate that the base station successfully decodes the preamble sequence.

When decoding succeeds, the decoding response information is sent to the UE, so that the UE learns whether the base station successfully decodes the preamble sequence.

The decoding response information may be identifier information, or may be a combination of identifier information and a preamble sequence. For example, if identifier information is "1", it indicates that the base station successfully decodes the preamble sequence. If the decoding response information is a combination of identifier information and a preamble sequence, in addition to determining whether the identifier information is "1", the UE further determines whether the received preamble sequence is the same as the preamble sequence sent by the UE; if the received preamble sequence is the same as the preamble sequence sent by the UE, and the identifier information is "1", it indicates that the base station successfully decodes the preamble sequence. In addition, the decoding response information may further include time synchronization information, so that the UE adjusts time setting of the UE according to the received time synchronization information, so as to synchronize with the base station in a time sequence.

Step 404: Receive, by using the uplink time-frequency resource, a data packet sent by the UE.

After receiving the decoding response message, the UE sends the data packet to the base station, and the base station receives the data packet on the uplink time-frequency resource.

In the data transmission method provided in this embodiment of the present invention, a base station can decode a preamble sequence sent by UE; determine, according to the decoded preamble sequence, an uplink time-frequency resource used by the UE to upload a data packet and a downlink time-frequency resource used by the UE to receive a decoding response message; and receive, by using the uplink time-frequency resource, the data packet sent by the UE. In the prior art, the base station needs to send information about a time-frequency resource to the UE in a random access response; the base station further needs to establish a synchronous connection with the UE, and send a conflict resolution message to the UE, and then the UE determines that a data packet can be sent, which generates a large number of signaling overheads. In this embodiment of the present invention, because the UE can determine the uplink time-frequency resource and the downlink time-frequency resource, the base station does not need to notify the UE of the uplink time-frequency resource and the downlink time-frequency resource, thereby reducing system overheads. If the UE has not received the decoding response information, it can be determined that decoding by the base station fails. In this way, that the UE blindly transmits a data packet is avoided, and transmission efficiency is improved. In addition, when the decoding information is identifier information, because a data volume of the identifier information is less than that of a combination of identifier information and a preamble sequence, signaling overheads can be reduced. When the decoding response information is a combination of identifier information and a preamble sequence, the UE can determine, according to the received decoding response information, whether a preamble sequence decoded by the base station is the preamble sequence selected by the UE, thereby improving decoding accuracy, and improving data transmission efficiency.

Figure 5:
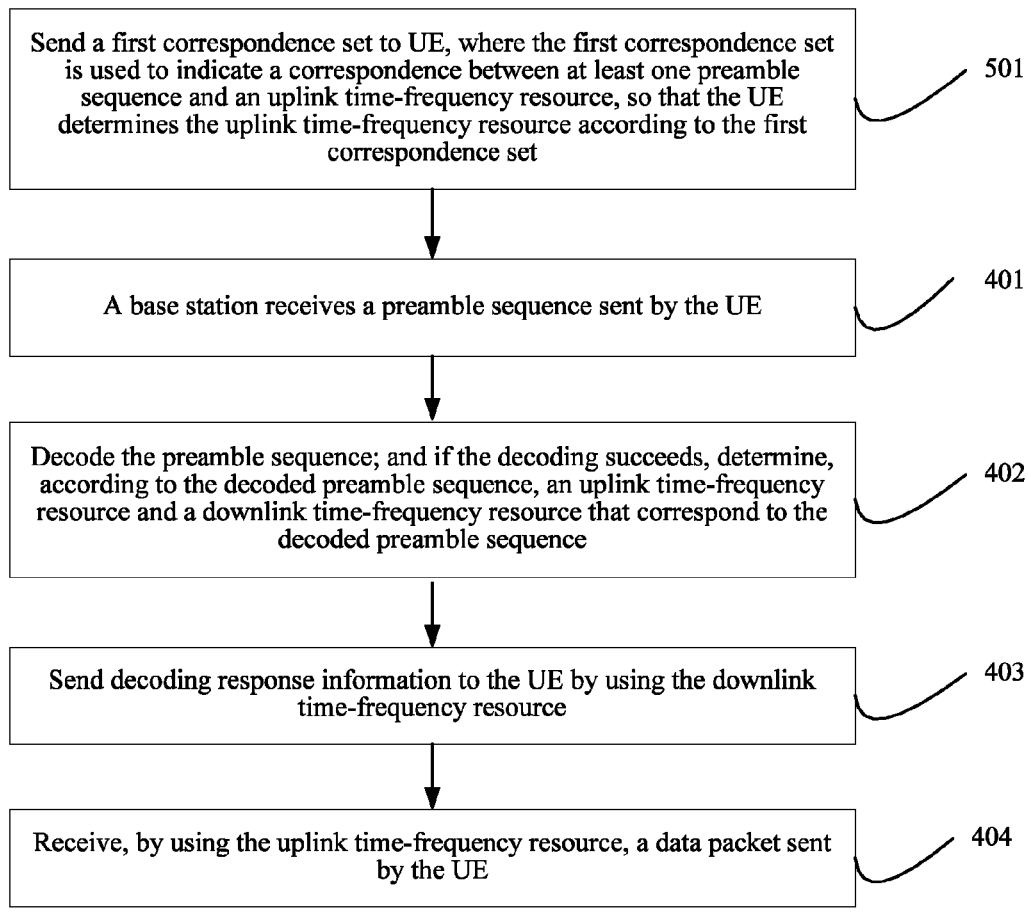
FIG. 5 is a flowchart of a fifth data transmission method according to an embodiment of the present invention.

An embodiment of the present invention further provides a data transmission method. As shown in FIG. 5, this embodiment is similar to the embodiment shown in FIG. 4, and a difference lies in that before step 401, the method further includes the following steps:

Step 501. Send a first correspondence set to UE, where the first correspondence set is used to indicate a correspondence between at least one preamble sequence and an uplink time-frequency resource, so that the UE determines the uplink time-frequency resource according to the first correspondence set.

In addition to an M2M service, transmission services for which the base station is responsible further include communication such as a telephony service and a multimedia service. Because the M2M service varies according to distribution of devices in each cell, the base station needs to determine, according to time-frequency resource overheads required by each communications service, a quantity of time-frequency resources allocated to the M2M service. After the quantity of time-frequency resources allocated to the M2M service is determined, a set of a relationship between a preamble sequence used by the M2M service and an uplink time-frequency resource, that is, the first correspondence set is sent to the UE, so that the UE determines the uplink time-frequency resource corresponding to the preamble sequence.

In the data transmission method provided in this embodiment of the present invention, a time-frequency resource can be properly allocated to the M2M service according to usage of an uplink time-frequency resource of a base station, and resource utilization of the base station can be improved.

Figure 6:
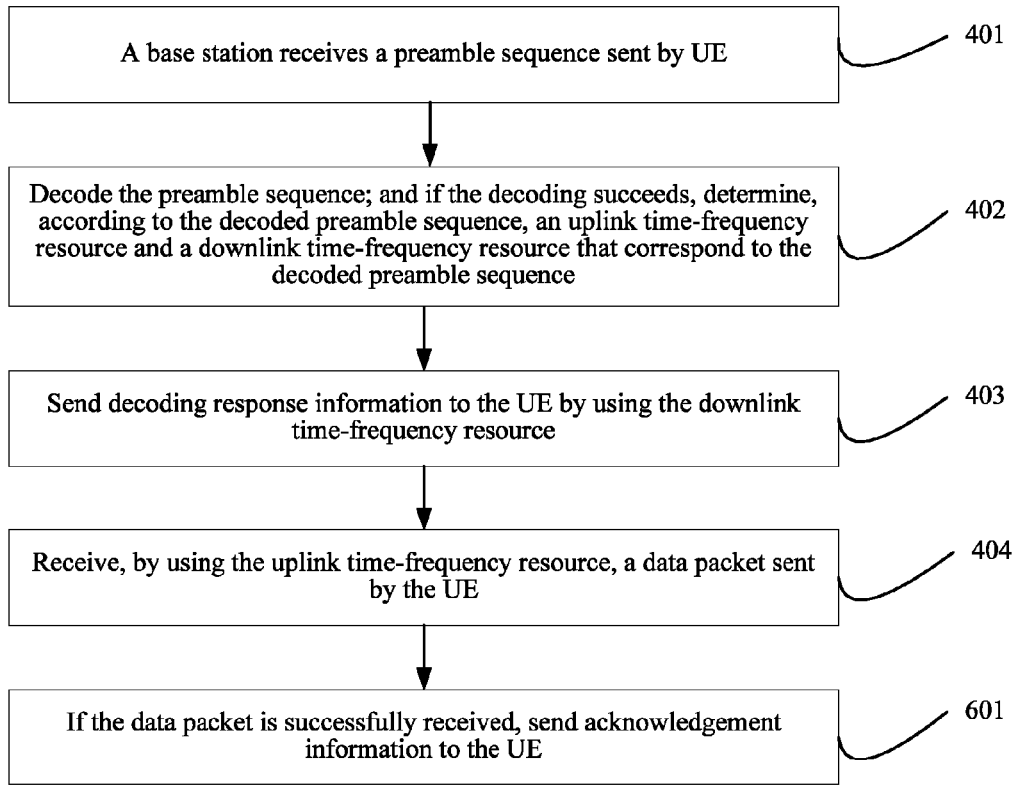
FIG. 6 is a flowchart of a sixth data transmission method according to an embodiment of the present invention.

An embodiment of the present invention further provides a data transmission method. As shown in FIG. 6, this embodiment is similar to the embodiment shown in FIG. 4, and a difference lies in that after step 404, the method further includes the following steps:

Step 601: If the data packet is successfully received, send acknowledgement information to the UE.

The acknowledgement information is used to indicate that the base station already successfully receives the data packet.

After determining that the data packet sent by the UE is received by using the uplink time-frequency resource corresponding to the decoded preamble sequence, the base station sends the acknowledgement information to the UE, so that the UE learns that the data packet is successfully sent.

In the data transmission method provided in this embodiment of the present invention, after it is determined that a data packet is successfully received, acknowledgement information can be sent to UE, so that the UE can determine, according to a receiving state of the acknowledgement information, whether to perform sending of a preamble sequence and a subsequent step again. That the UE blindly transmits a data packet is avoided in a case in which the UE does not learn whether a data packet is successfully sent, thereby properly using a channel resource, and improving accuracy of data packet transmission.

An embodiment of the present invention further provides a data transmission method. This embodiment is similar to the embodiment shown in FIG. 4, and a difference lies in that in step 403, the decoding response information further carries information about the uplink time-frequency resource used by the UE to send data. In this case, the UE can learn the uplink time-frequency resource according to the decoding response information in step 403, and send a data packet to the base station by using the uplink time-frequency resource.

During implementation of the foregoing embodiments, two embodiments may be combined for implementation, or multiple embodiments may be combined for implementation.

Figure 7:
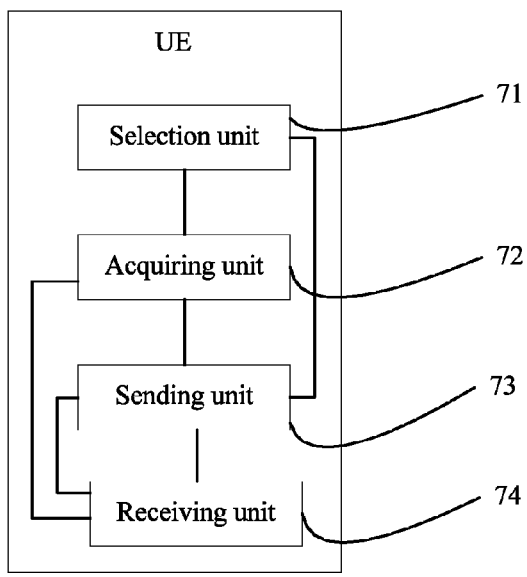
FIG. 7 is a schematic structural diagram of UE according to an embodiment of the present invention.

An embodiment of the present invention further provides user equipment UE, and as shown in FIG. 7, the user equipment includes: a selection unit 71, configured to select a preamble sequence; an acquiring unit 72, configured to acquire, according to a correspondence set and the preamble sequence that is selected by the selection unit 71, an uplink time-frequency resource and a downlink time-frequency resource that are corresponding to the preamble sequence; a sending unit 73, configured to send the preamble sequence acquired by the selection unit 71 to a base station, so that the base station decodes the preamble sequence, and determines, according to the decoded preamble sequence, the uplink time-frequency resource and the downlink time-frequency resource that are corresponding to the decoded preamble sequence; and a receiving unit 74, configured to receive, by using the downlink time-frequency resource, decoding response information sent from the base station, where the sending unit 73 is further configured to, when the receiving unit 74 receives the decoding response information sent from the base station, send a data packet to the base station by using the uplink time-frequency resource, where the decoding response information is used to indicate that the base station successfully decodes the preamble sequence.

In the prior art, LTE sets 64 preamble sequences for each cell, where the preamble sequences are orthogonal to each other. In the present invention, less than 64 preamble sequences may be set according to a load situation of M2M data transmission of each cell, where the preamble sequences are still orthogonal to each other. However, because a quantity of the preamble sequences that need to keep orthogonal to each other decreases, a length of each preamble sequence shortens. Therefore, a data volume of the preamble sequences is reduced, and signaling overheads can be reduced.

An OFDM symbol, or a currently used preamble sequence in format 4 may be used as the preamble sequence.

A selection method used by the selection unit 71 to select a preamble sequence may be random selection, or may be sequential selection, and a specific selection manner is not limited herein.

By searching the first correspondence set and the second correspondence set, the acquiring unit 72 can acquire the uplink time-frequency resource and the downlink time-frequency resource that are corresponding to the preamble sequence. The first correspondence set and the second correspondence set may be separately stored in different data tables, or may be stored in a same content store table. By using the preamble sequence as a keyword, the acquiring unit can find the unique uplink time-frequency resource and the unique downlink time-frequency resource that are corresponding to the preamble sequence.

The selection unit 71 selects the preamble sequence from a preamble sequence set, and the acquiring unit 72 respectively finds, from the first correspondence set and the second correspondence set, the uplink time-frequency resource and the downlink time-frequency resource that are corresponding to the selected preamble sequence selected by the selection unit 71.

The sending unit 73 sends the preamble sequence selected by the selection unit 71 to the base station, and the base station can determine, according to the preamble sequence, the uplink time-frequency resource and the downlink time-frequency resource that are corresponding to the decoded preamble sequence. If selection units 71 of multiple UEs simultaneously select a same preamble sequence, and sending units 73 of the UEs simultaneously send the preamble sequence to the base station, preamble sequence signals interfere with each other. As a result, strength of the preamble sequence signals decreases, and the base station cannot parse out the preamble sequence. The base station can determine, only after successfully decoding the preamble sequence, the uplink time-frequency resource and the downlink time-frequency resource that are corresponding to the decoded preamble sequence, and send the decoding response information to the UE by using the downlink time-frequency resource.

The decoding response information received by the receiving unit 74 may be identifier information, or may be a combination of identifier information and a preamble sequence. For example, if identifier information is "1", the receiving unit 74 can determine that the base station successfully decodes the preamble sequence. If the decoding response information is a combination of identifier information and a preamble sequence, in addition to determining whether the identifier information is "1", the receiving unit 74 further determines whether the received preamble sequence is the same as the preamble sequence sent by the UE; if the received preamble sequence is the same as the preamble sequence sent by the UE, and the identifier information is "1", the receiving unit 74 determines that the base station successfully decodes the preamble sequence. In addition, the decoding response information may further include time synchronization information, and the receiving unit 74 adjusts time setting of the UE according to the received time synchronization information, so as to synchronize with the base station in a time sequence.

If the receiving unit 74 receives the decoding response information sent from the base station, it indicates that the base station currently already learns the uplink time-frequency resource to be used by the sending unit 73, and waits, on the uplink time-frequency resource, for the data packet sent by the sending unit 73. The sending unit 73 sends the data packet to the base station, so that the base station sends the data packet to a core network device.

In the UE provided in the present invention, the acquiring unit 72 can acquire an uplink time-frequency resource and a downlink time-frequency resource that are corresponding to the preamble sequence; and when the receiving unit 74 receives, by using the downlink time-frequency resource, decoding response information sent from a base station, the sending unit 73 sends a data packet to the base station by using the uplink time-frequency resource acquired by the acquiring unit 72. In the prior art, the function of acquiring the time-frequency resources that are corresponding to the preamble sequence is implemented by the base station; the base station needs to send, to the UE in a random access response, a series of information about the time-frequency resources that are corresponding to the preamble sequence, and then the UE acquires the time-frequency resources, which increases a signaling amount.

In addition, the UE needs to determine the uplink time-frequency resource and the downlink time-frequency resource according to the series of information sent from the base station. Further, in the prior art, the base station needs to perform synchronization and conflict resolution with the UE, and multiple pieces of signaling are generated in these two functions. In the present invention, the acquiring unit 72 can acquire, without using the series of information sent from the base station, the uplink time-frequency resource and the downlink time-frequency resource that are corresponding to the preamble sequence, thereby achieving a technical effect of locally acquiring the uplink time-frequency resource and the downlink time-frequency resource.

After the receiving unit 74 receives the decoding response information sent from the base station, data transmission can be directly performed according to the uplink time-frequency resource or the downlink time-frequency resource locally determined by the acquiring unit 72, thereby avoiding system overheads during a random response process in the prior art. In addition, the receiving unit 74 can determine, according to the decoding response information sent from the base station, that the UE synchronizes with the base station and there is no conflict, thereby further reducing signaling overheads during a random access process and improving transmission efficiency.

Figure 8:
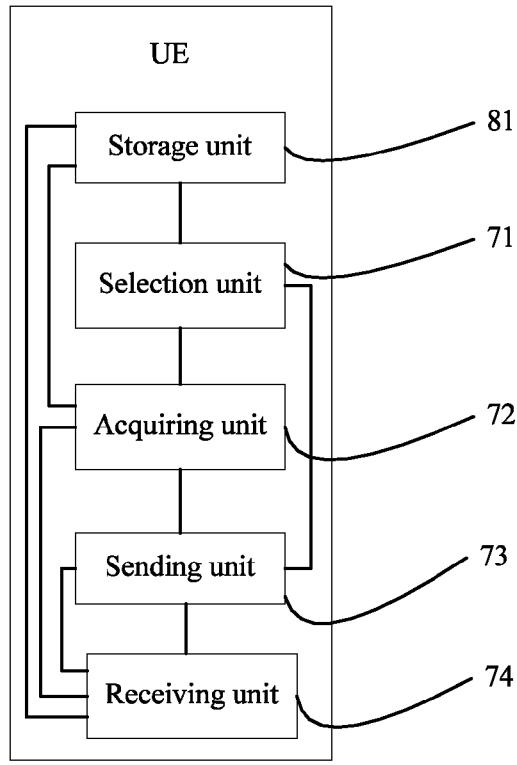
FIG. 8 is a schematic structural diagram of another piece of UE according to an embodiment of the present invention.

An embodiment of the present invention further provides another piece of UE. As shown in FIG. 8, this embodiment is similar to the embodiment shown in FIG. 7, and a difference lies in that the UE further includes: a storage unit 81, configured to store sets of correspondences between the preamble sequence and the uplink time-frequency resource and between the preamble sequence and the downlink time-frequency resource, and a preamble sequence set, where the storage unit 81 is further configured to pre-store a first correspondence set, where the first correspondence set is used to indicate a correspondence between at least one preamble sequence and an uplink time-frequency resource; the acquiring unit 72 is further configured to acquire, from the first correspondence set pre-stored by the storage unit 81, the uplink time-frequency resource corresponding to the preamble sequence; the receiving unit 74 is further configured to receive the first correspondence set sent from the base station; the acquiring unit 72 is further configured to acquire, from the first correspondence set received by the receiving unit 74, the uplink time-frequency resource corresponding to the preamble sequence; the storage unit 81 is further configured to pre-store a second correspondence set, where the second correspondence set is used to indicate a correspondence between at least one preamble sequence and a downlink time-frequency resource; and the acquiring unit is further configured to acquire, from the second correspondence set pre-stored by the storage unit, the downlink time-frequency resource corresponding to the preamble sequence.

The storage unit 81 saves the set of a first correspondence between a preamble sequence and an uplink time-frequency resource, and the set of a second correspondence between a preamble sequence and a downlink time-frequency resource. The first correspondence set includes a correspondence between at least one preamble sequence and an uplink time-frequency resource, and the second correspondence set includes a correspondence between at least one preamble sequence and a downlink time-frequency resource.

The acquiring unit 72 may obtain the first correspondence set in two manners: pre-storing the first correspondence set by the storage unit 81 and receiving, by the receiving unit 74, the first correspondence set sent from the base station. In the manner of receiving, by the receiving unit 74, the first correspondence set sent from the base station, the first correspondence set may be loaded in signaling. In addition to M2M communication, the base station is also responsible for other data transmission services such as voice call; therefore, the uplink time-frequency resource that is inside the base station and used by the sending unit 73 for uploading may be fixed, or may be temporarily allocated by the base station. In the case in which the base station temporarily allocates the uplink time-frequency resource, after the first correspondence set is sent to the receiving unit 74 by means of signaling, the base station is enabled to dynamically adjust the uplink time-frequency resource that is inside the base station, so as to improve the resource usage efficiency of the base station. In addition, by copying, from a mobile device, the first correspondence set and the second correspondence set to the UE, that is, pre-storing the first correspondence set and the second correspondence set, network transmission does not need to be performed, which can reduce load of the base station.

In the UE provided in this embodiment of the present invention, by pre-storing by the storage unit 81, the first correspondence set and the second correspondence set can be acquired, by means of pre-storing by the storage unit 81, without network transmission, and occupation of a channel of a base station is avoided during an acquiring process, which reduces load of the base station. In addition, the receiving unit 74 receives the first correspondence set sent from the base station, the base station is enabled to dynamically adjust an uplink time-frequency resource that is inside the base station, so as to improve the resource usage efficiency of the base station.

An embodiment of the present invention further provides another piece of UE. This embodiment further describes the embodiment shown in FIG. 7, and the selection unit 71 is further configured to: when the receiving unit 74 has not received, within first preset duration, the decoding response information sent from the base station, reselect a preamble sequence after second preset duration.

If communication is normal, after the sending unit 73 sends the preamble sequence, the base station can complete decoding of the preamble sequence within the first preset duration such as 4 ms, and send the decoding response information to the receiving unit 74. If the receiving unit 74 has not received the decoding response information within the first preset duration, a processing unit 75 generates another backoff window, and the selection unit 71 reselects a preamble sequence after the second preset duration such as 50 ms. A length of a second preset time is the same as that of the backoff window.

In the another piece of UE provided in the present invention, the receiving unit 74 can determine, according to whether decoding response information is received, whether a preamble sequence is to be reselected by the selection unit 71. That the sending unit 73 blindly transmits a data packet by using an uplink time-frequency resource corresponding to the preamble sequence is avoided in a case in which the sending unit 73 does not learn whether a base station successfully decodes a preamble sequence, thereby properly using a channel resource, and improving accuracy of data packet transmission.

An embodiment of the present invention further provides UE. This embodiment further describes the embodiment shown in FIG. 7, and the receiving unit 74 is further configured to receive acknowledgement information sent from the base station, where the acknowledgement information is used to indicate that the base station already successfully receives the data packet sent by the sending unit; and the selection unit 71 is further configured to: when the receiving unit 74 has not received, within third preset duration, the acknowledgement information sent from the base station, reselect a preamble sequence after fourth preset duration.

After the sending unit 73 sends the data packet to the base station, the base station needs to forward the data packet to a core network device for continuous transmission. If a fault occurs in communication between the base station and the core network device, the acknowledgement information cannot be generated, that is, the data packet is not successfully sent. If communication is normal, the base station sends the acknowledgement information to the receiving unit 74 within, for example, 12 ms, that is, the third preset duration after the sending unit 73 sends the preamble sequence. If the receiving unit 74 has not received the acknowledgement information, a backoff window is generated, and the selection unit 71 reselects a preamble sequence after the fourth preset duration such as 1 s. A length of a fourth preset time is the same as that of the backoff window.

In the another piece of UE provided in this embodiment of the present invention, the receiving unit 74 can determine, according to whether acknowledgement message is received, whether a preamble sequence is to be reselected by the selection unit 71. That the sending unit 73 blindly transmits a data packet is avoided in a case in which the sending unit 73 does not learn whether a data packet is successfully sent, thereby properly using an uplink time-frequency resource, and improving accuracy of data packet transmission.

An embodiment of the present invention further provides UE. This embodiment is similar to the embodiment shown in FIG. 7, and a difference lies in that the decoding response information received by the receiving unit 74 further carries information about the uplink time-frequency resource used by the UE to send data. In this case, the acquiring unit 72 may need to acquire only the downlink time-frequency resource corresponding to the preamble sequence; and the acquiring unit 72 may acquire the uplink time-frequency resource according to the decoding response information received by the receiving unit 74, and the sending unit sends the data packet to the base station by using the uplink time-frequency resource acquired by the acquiring unit 72. The storage unit 81 may pre-store only the second correspondence set. In this case, the information about the uplink time-frequency resource used by the user may be acquired from the decoding response information received by the receiving unit 74.

Figure 9:
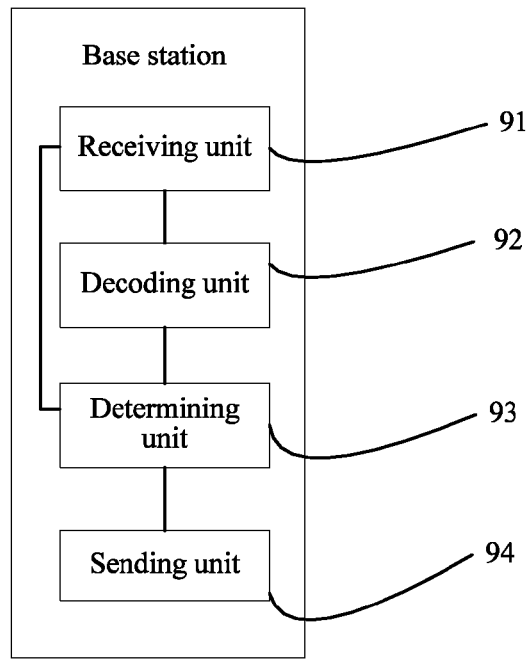
FIG. 9 is a schematic structural diagram of a base station according to an embodiment of the present invention.

An embodiment of the present invention further provides a base station, and as shown in FIG. 9, the base station includes: a receiving unit 91, configured to receive a preamble sequence sent by UE; a decoding unit 92, configured to decode the preamble sequence received by the receiving unit 91; a determining unit 93, configured to: when decoding by the decoding unit 92 succeeds, determine, according to the decoded preamble sequence obtained by the decoding unit 92 and a correspondence set, an uplink time-frequency resource and a downlink time-frequency resource that are corresponding to the decoded preamble sequence; and a sending unit 94, configured to send decoding response information to the UE according to the downlink time-frequency resource determined by the determining unit 93, where the decoding response information is used to indicate that the decoding unit successfully decodes the preamble sequence, where the receiving unit 91 is further configured to receive, by using the uplink time-frequency resource determined by the determining unit 93, a data packet sent by the UE.

Figure 10:
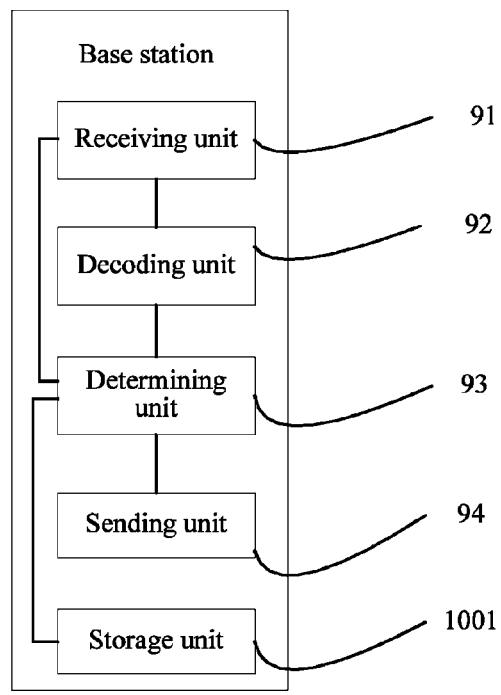
FIG. 10 is a schematic structural diagram of another base station according to an embodiment of the present invention.

An embodiment of the present invention further provides another base station. As shown in FIG. 10, this embodiment is similar to the embodiment shown in FIG. 9, and a difference lies in that the base station further includes a storage unit 1001, configured to store sets of correspondences between the preamble sequence and the uplink time-frequency resource and between the preamble sequence and the downlink time-frequency resource, and a preamble sequence set.

Because the storage unit 1001 saves a first correspondence set and a second correspondence set, the determining unit 93 can determine, according to the received preamble sequence, the uplink time-frequency resource and the downlink time-frequency resource that are corresponding to the preamble sequence. The decoding unit 92 can determine whether information sent by the UE is a preamble sequence by identifying an identifier field of the information sent by the UE, and obtain the preamble sequence by parsing the received information, so as to complete decoding. If multiple UEs simultaneously select a same preamble sequence and simultaneously send the preamble sequence to the base station, because preamble sequences conflict with each other and interfere the base station, the information sent by the UE cannot be identified, and decoding by the decoding unit 92 fails. When decoding fails, the receiving unit 91 waits for the UE to resend data, so that the decoding unit 92 decodes the preamble sequence again.

When decoding by the decoding unit 92 succeeds, the sending unit 94 sends the decoding response information to the UE, so that the UE learns whether the base station successfully decodes the preamble sequence.

The decoding response information may be identifier information, or may be a combination of identifier information and a preamble sequence. For example, if identifier information is "1", it indicates that the base station successfully decodes the preamble sequence. If the decoding response information is a combination of identifier information and a preamble sequence, in addition to determining whether the identifier information is "1", the UE further determines whether the received preamble sequence is the same as the preamble sequence sent by the UE; if the received preamble sequence is the same as the preamble sequence sent by the UE, and the identifier information is "1", it indicates that the base station successfully decodes the preamble sequence. In addition, the decoding response information may further include time synchronization information, so that the UE adjusts time setting of the UE according to the received time synchronization information, so as to synchronize with the base station in a time sequence.

After the sending unit 94 sends the decoding response message, the UE sends the data packet to the base station, and the receiving unit 91 receives, by using the uplink time-frequency resource, the data packet sent by the UE.

In the base station provided in this embodiment of the present invention, the decoding unit 92 can decode a preamble sequence sent by UE; the determining unit 93 determines, according to the decoded preamble sequence, an uplink time-frequency resource used by the UE to upload a data packet and a downlink time-frequency resource used by the UE to receive a decoding response message; and the receiving unit 91 receives, by using the uplink time-frequency resource, the data packet sent by the UE. In the prior art, the base station needs to send information about a time-frequency resource to the UE in a random access response; the base station further needs to establish a synchronous connection with the UE, and send a conflict resolution message to the UE, and then the UE determines that a data packet can be sent, which generates a large number of signaling overheads. In this embodiment of the present invention, because the UE can determine the uplink time-frequency resource and the downlink time-frequency resource, the sending unit 94 does not need to notify the UE of the uplink time-frequency resource and the downlink time-frequency resource, thereby reducing system overheads.

If the UE has not received the decoding response information, it can be determined that decoding by the base station fails. In this way, that the UE blindly transmits a data packet is avoided, and transmission efficiency is improved. In addition, when the decoding response information is identifier information, because a data volume of the identifier information is less than that of a combination of identifier information and a preamble sequence, signaling overheads can be reduced. When the decoding response information is a combination of identifier information and a preamble sequence, the UE can determine, according to the received decoding response information, whether a preamble sequence decoded by the base station is the preamble sequence selected by the UE, thereby improving decoding accuracy, and improving data transmission efficiency. The determining unit 93 can allocate an uplink time-frequency resource to M2M according to usage of an uplink time-frequency resource of the base station, and the sending unit 94 sends a correspondence between the uplink time-frequency resource and the preamble sequence to the UE to improve resource utilization of the base station.

If the UE has not received the decoding response information sent by the sending unit 94, it can be determined that decoding by the decoding unit 92 fails. In this way, that the UE blindly transmits a data packet is avoided, and transmission efficiency is improved. In addition, when the decoding information is identifier information, because a data volume of the identifier information is less than that of a combination of identifier information and a preamble sequence, signaling overheads can be reduced. When the decoding response information is a combination of identifier information and a preamble sequence, the UE can determine, according to the received decoding response information, whether a preamble sequence decoded by the base station is the preamble sequence selected by the UE, thereby improving decoding accuracy, ensuring that the UE and the base station perform data transmission on the uplink time-frequency resource and the downlink time-frequency resource that are corresponding to the same preamble sequence, and improving data transmission efficiency.

An embodiment of the present invention further provides a base station. This embodiment further describes the embodiment shown in FIG. 9, and the sending unit is further configured to send a first correspondence set to the UE, where the first correspondence set is used to indicate a correspondence between at least one preamble sequence and an uplink time-frequency resource, so that the UE determines the uplink time-frequency resource according to the first correspondence set.

The determining unit 93 needs to determine, according to uplink time-frequency resource overheads required by each communications service, a quantity of time-frequency resources allocated to the M2M service. After the determining unit 93 determines the quantity of time-frequency resources allocated to the M2M service, the sending unit 94 sends, to the UE, a set of a relationship between a preamble sequence used by the M2M service and an uplink time-frequency resource, that is, the first correspondence set, so that the UE determines the uplink time-frequency resource corresponding to the preamble sequence.

In the base station provided in this embodiment of the present invention, the determining unit 93 can properly allocate an uplink time-frequency resource to M2M according to usage of an uplink time-frequency resource of the base station, thereby improving resource utilization of the base station.

An embodiment of the present invention further provides another base station. This embodiment further describes the embodiment shown in FIG. 9, and the sending unit is further configured to send acknowledgement information to the UE when the receiving unit successfully receives the data packet, where the acknowledgement information is used to indicate that the receiving unit already successfully receives the data packet.

After the determining unit 93 determines that the data packet is successfully received, the sending unit 94 sends the acknowledgement information to the UE, so that the UE learns that the data packet is already successfully sent.

In the another base station provided in this embodiment of the present invention, after the determining unit 93 determines that a data packet is successfully received, the sending unit 94 may send acknowledgement information to UE, so that the UE can determine, according to a receiving state of the acknowledgement information, whether to perform sending of a preamble sequence and a subsequent step again. That the UE blindly transmits a data packet is avoided in a case in which the UE does not learn whether a data packet is successfully sent, thereby properly using a channel resource, and improving accuracy of data packet transmission.

An embodiment of the present invention further provides a base station. This embodiment is similar to the embodiment shown in FIG. 9, and a difference lies in that the decoding response information sent by the sending unit 94 further carries information about the uplink time-frequency resource used by the UE to send data. In this case, the sending unit 94 sends the decoding response information to the UE, so that the UE learns the uplink time-frequency resource according to the decoding response information and sends the data packet to the base station by using the uplink time-frequency resource.

Figure 11:
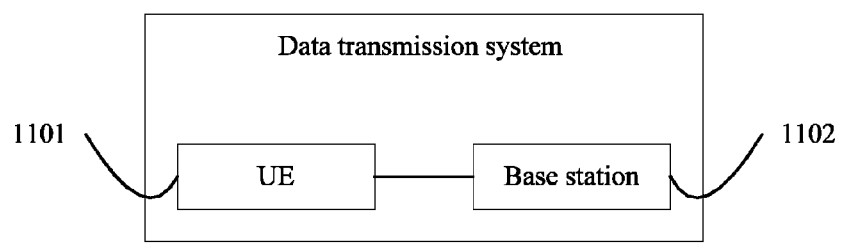
FIG. 11 is a schematic diagram of a data transmission system according to an embodiment of the present invention.

An embodiment of the present invention further provides a data transmission system. As shown in FIG. 11, the system includes UE 1101 shown in FIG. 8 and a base station 1102 shown in FIG. 10, where the UE 1101 is configured to select a preamble sequence, and acquire an uplink time-frequency resource and a downlink time-frequency resource that are corresponding to the preamble sequence; and send the preamble sequence to the base station 1102; the base station 1102 is configured to receive a preamble sequence sent by the user equipment UE 1101; decode the preamble sequence; and if the decoding succeeds, determine, according to the decoded preamble sequence, the uplink time-frequency resource and the downlink time-frequency resource that are corresponding to the decoded preamble sequence; and send decoding response information to the UE 1101 by using the downlink time-frequency resource, where the decoding response information is used to indicate that the base station 1102 successfully decodes the preamble sequence; the UE 1101 is further configured to: when the decoding response information sent from the base station 1102 is received by using the downlink time-frequency resource, send a data packet to the base station 1102 by using the uplink time-frequency resource corresponding to the preamble sequence; and the base station 1102 is further configured to receive, by using the uplink time-frequency resource, the data packet sent by the UE 1101.

In the data transmission system provided in the present invention, the UE 1101 can locally acquire an uplink time-frequency resource and a downlink time-frequency resource that are corresponding to the preamble sequence, and when receiving decoding response information sent from the base station 1102, the UE 1101 directly sends a data packet to the base station by using the uplink time-frequency resource. In the prior art, the step of acquiring the time-frequency resources that are corresponding to the preamble sequence is implemented by the base station 1102; the base station 1102 needs to send, to the UE 1101 in a random access response, a series of information about the time-frequency resources that are corresponding to the preamble sequence, and then the UE 1101 acquires the time-frequency resources, which increases a signaling amount. Further, in the prior art, the base station 1102 needs to perform synchronization and conflict resolution with the UE 1101, and multiple pieces of signaling are generated in these two steps. In the present invention, the UE 1101 can locally acquire the time-frequency resources, thereby avoiding signaling overheads during a random response process in the prior art. In addition, the UE 1101 can determine, according to the decoding response information sent from the base station 1102, that the UE 1101 synchronizes with the base station 1102 and there is no conflict, thereby further reducing signaling overheads during a random access process and improving transmission efficiency. The base station 1102 can decode a preamble sequence sent by the UE 1101; determine, according to the decoded preamble sequence, an uplink time-frequency resource used by the UE 1101 to upload a data packet and a downlink time-frequency resource used by the UE 1101 to receive a decoding response message; and receive, by using the uplink time-frequency resource, the data packet sent by the UE 1101. In the prior art, the base station 1102 needs to send information about a time-frequency resource to the UE 1101 in a random access response; the base station 1102 further needs to establish a synchronous connection with the UE 1101, and send a conflict resolution message to the UE 1101, and then the UE 1101 determines that a data packet can be sent, which generates a large number of signaling overheads. In the present invention, because the UE 1101 can determine the uplink time-frequency resource and the downlink time-frequency resource, system overheads can be reduced, and transmission efficiency can be improved.

Figure 12:
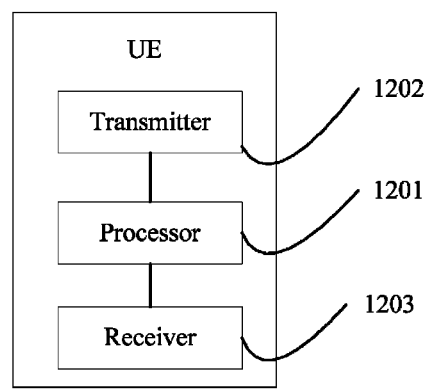
FIG. 12 is a schematic structural diagram of still another piece of UE according to an embodiment of the present invention.

An embodiment of the present invention further provides user equipment UE, and as shown in FIG. 12, the user equipment includes: a processor 1201, configured to select a preamble sequence from a preamble sequence set, and acquire, according to a correspondence set and the selected preamble sequence, an uplink time-frequency resource and a downlink time-frequency resource that are corresponding to the preamble sequence a transmitter 1202, configured to send the preamble sequence acquired by the processor 1201 to a base station, so that the base station decodes the preamble sequence, and determines, according to the decoded preamble sequence, the uplink time-frequency resource and the downlink time-frequency resource that are corresponding to the decoded preamble sequence; and a receiver 1203, configured to receive, by using the downlink time-frequency resource, decoding response information sent from the base station, where the decoding response information is used to indicate that the base station successfully decodes the preamble sequence, where the transmitter 1202 is further configured to: when the receiver 1203 receives the decoding response information sent from the base station, send a data packet to the base station by using the uplink time-frequency resource corresponding to the preamble sequence.

Figure 13:
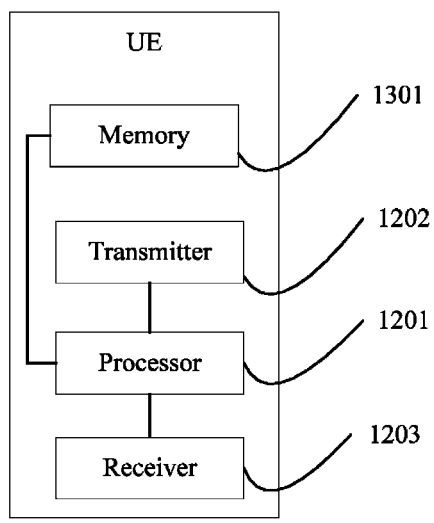
FIG. 13 is a schematic structural diagram of yet another piece of UE according to an embodiment of the present invention.

An embodiment of the present invention further provides UE. As shown in FIG. 13, this embodiment is similar to the embodiment shown in FIG. 12, and a difference lies in that the UE further includes: a memory 1301, configured to store sets of correspondences between the preamble sequence and the uplink time-frequency resource and between the preamble sequence and the downlink time-frequency resource, and a preamble sequence set, where the memory 1301 is further configured to pre-store a first correspondence set, where the first correspondence set is used to indicate a correspondence between at least one preamble sequence and an uplink time-frequency resource; the processor 1201 is further configured to acquire, from the first correspondence set pre-stored by the memory 1301, the uplink time-frequency resource corresponding to the preamble sequence; the receiver 1203 is further configured to receive the first correspondence set sent from the base station; the processor 1201 is further configured to acquire, from the first correspondence set received by the receiver 1203, the uplink time-frequency resource corresponding to the preamble sequence; the memory 1301 is further configured to pre-store a second correspondence set, where the second correspondence set is used to indicate a correspondence between at least one preamble sequence and a downlink time-frequency resource; and the processor 1201 is further configured to acquire, from the second correspondence set pre-stored by the memory 1301, the downlink time-frequency resource corresponding to the preamble sequence.

An embodiment of the present invention further provides UE. This embodiment further describes the embodiment shown in FIG. 12, and the processor 1201 is further configured to: when the receiver 1203 has not received, within first preset duration by using the downlink time-frequency resource corresponding to the preamble sequence, the decoding response information sent from the base station, reselect a preamble sequence after second preset duration.

An embodiment of the present invention further provides UE. This embodiment further describes the embodiment shown in FIG. 12, and the receiver 1203 is further configured to receive acknowledgement information sent from the base station, where the acknowledgement information is used to indicate that the base station already successfully receives the data packet sent by the UE; and the processor 1201 is further configured to: when the receiver 1203 has not received, within third preset duration, the acknowledgement information sent from the base station, reselect a preamble sequence after fourth preset duration.

In the UE provided in the present invention, the processor 1201 can acquire an uplink time-frequency resource and a downlink time-frequency resource that are corresponding to the preamble sequence, and when the receiver 1203 receives, by using the downlink time-frequency resource, decoding response information sent from a base station, the transmitter 1202 sends a data packet to the base station by using the uplink time-frequency resource acquired by the processor 1201. In the prior art, the function of acquiring the time-frequency resources that are corresponding to the preamble sequence is implemented by the base station; the base station needs to send, to the UE in a random access response, a series of information about the time-frequency resources that are corresponding to the preamble sequence, and then the UE acquires the time-frequency resources, which increases a signaling amount. In addition, the UE needs to determine the uplink time-frequency resource and the downlink time-frequency resource according to the series of information sent from the base station. Further, in the prior art, the base station needs to perform synchronization and conflict resolution with the UE, and multiple pieces of signaling are generated in these two functions. In the present invention, the processor 1201 can acquire, without using the series of information sent from the base station, the uplink time-frequency resource and the downlink time-frequency resource that are corresponding to the preamble sequence, thereby achieving a technical effect of locally acquiring the uplink time-frequency resource and the downlink time-frequency resource. After the receiver 1203 receives the decoding response information sent from the base station, data transmission can be directly performed according to the uplink time-frequency resource or the downlink time-frequency resource locally determined by the acquiring unit 72, thereby avoiding system overheads during a random response process in the prior art. In addition, the receiver 1203 can determine, according to the decoding response information sent from the base station, that the UE synchronizes with the base station and there is no conflict, thereby further reducing signaling overheads during a random access process and improving transmission efficiency.

Figure 14:
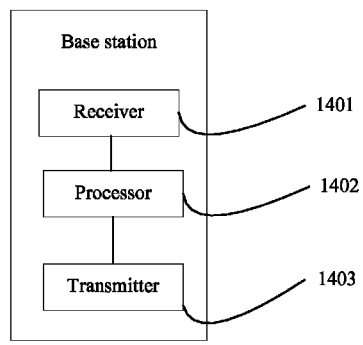
FIG. 14 is a schematic structural diagram of still another base station according to an embodiment of the present invention.

An embodiment of the present invention further provides a base station, and as shown in FIG. 14, the base station includes: a receiver 1401, configured to receive a preamble sequence sent by user equipment UE; a processor 1402, configured to decode the preamble sequence received by the receiver 1401; and when the decoding succeeds, determine, according to the decoded preamble sequence and the correspondence set stored by the memory 1501, an uplink time-frequency resource and a downlink time-frequency resource that are corresponding to the decoded preamble sequence;

and a transmitter 1403, configured to send decoding response information to the UE according to the downlink time-frequency resource determined by the processor 1402, where the decoding response information is used to indicate that the base station successfully decodes the preamble sequence, where the receiver 1401 is further configured to receive, by using the uplink time-frequency resource determined by the processor 1402, a data packet sent by the UE.

Figure 15:
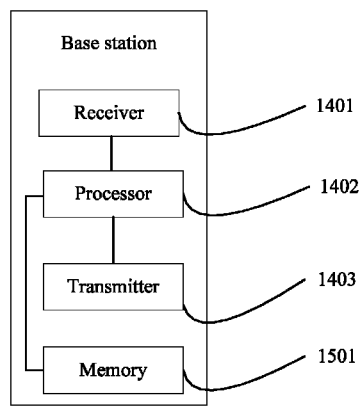
FIG. 15 is a schematic structural diagram of yet another base station according to an embodiment of the present invention.

An embodiment of the present invention further provides a base station. As shown in FIG. 15, this embodiment is similar to the embodiment shown in FIG. 14, and a difference lies in that the base station further includes: a memory 1501, configured to store sets of correspondences between the preamble sequence and the uplink time-frequency resource and between the preamble sequence and the downlink time-frequency resource, and a preamble sequence set.

Because the memory 1501 saves a first correspondence set and a second correspondence set, the processor 1402 can determine, according to the received preamble sequence, the uplink time-frequency resource and the downlink time-frequency resource that are corresponding to the preamble sequence. The processor 1402 can determine whether information sent by the UE is a preamble sequence by identifying an identifier field of the information sent by the UE, and obtain the preamble sequence by parsing the received information, so as to complete decoding. If multiple UEs simultaneously select a same preamble sequence and simultaneously send the preamble sequence to the base station, because preamble sequences conflict with each other and interfere the base station, the information sent by the UE cannot be identified, and decoding by the processor 1402 fails. When decoding fails, the receiver 1401 waits for the UE to resend data, so that the processor 1402 decodes the preamble sequence again.

An embodiment of the present invention further provides a base station. This embodiment further describes the embodiment shown in FIG. 14, and the transmitter 1403 is further configured to send a first correspondence set to the UE, where the first correspondence set is used to indicate a correspondence between at least one preamble sequence and an uplink time-frequency resource, so that the UE determines the uplink time-frequency resource according to the first correspondence set.

An embodiment of the present invention further provides a base station. This embodiment further describes the embodiment shown in FIG. 14, and the transmitter 1403 is further configured to send acknowledgement information to the UE when the receiver 1401 successfully receives the data packet, where the acknowledgement information is used to indicate that the base station already successfully receives the data packet.

In the base station provided in this embodiment of the present invention, the processor 1402 can decode a preamble sequence sent by UE, and determine, according to the decoded preamble sequence, an uplink time-frequency resource used by the UE to upload a data packet and a downlink time-frequency resource used by the UE to receive a decoding response message; and the receiver 1401 receives, by using the uplink time-frequency resource, the data packet sent by the UE. In the prior art, the base station needs to send information about a time-frequency resource to the UE in a random access response; the base station further needs to establish a synchronous connection with the UE, and send a conflict resolution message to the UE, and then the UE determines that a data packet can be sent, which generates a large number of signaling overheads. In this embodiment of the present invention, because the UE can determine the uplink time-frequency resource and the downlink time-frequency resource, the transmitter 1403 does not need to notify the UE of the uplink time-frequency resource and the downlink time-frequency resource, thereby reducing system overheads. If the UE has not received the decoding response information, it can be determined that decoding by the base station fails. In this way, that the UE blindly transmits a data packet is avoided, and transmission efficiency is improved. In addition, when the decoding response information is identifier information, because a data volume of the identifier information is less than that of a combination of identifier information and a preamble sequence, signaling overheads can be reduced. When the decoding response information is a combination of identifier information and a preamble sequence, the UE can determine, according to the received decoding response information, whether a preamble sequence decoded by the base station is the preamble sequence selected by the UE, thereby improving decoding accuracy, and improving data transmission efficiency. The processor 1402 can allocate a time-frequency resource to M2M according to usage of a time-frequency resource of the base station, and the transmitter 1403 sends the time-frequency resource to the UE to improve resource utilization of the base station. If the UE has not received the decoding response information sent by the transmitter 1403, it can be determined that decoding by the processor 1402 fails. In this way, that the UE blindly transmits a data packet is avoided, and transmission efficiency is improved. In addition, when the decoding information is identifier information, because a data volume of the identifier information is less than that of a combination of identifier information and a preamble sequence, signaling overheads can be reduced. When the decoding response information is a combination of identifier information and a preamble sequence, the UE can determine, according to the received decoding response information, whether a preamble sequence decoded by the base station is the preamble sequence selected by the UE, thereby improving decoding accuracy, ensuring that the UE and the base station perform data transmission on a same time-frequency resource, and improving data transmission efficiency.

Figure 16:
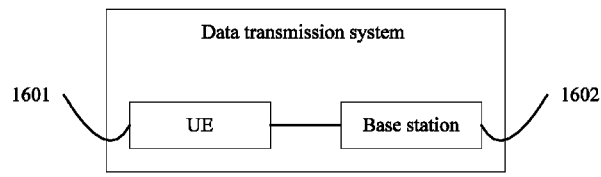
FIG. 16 is a schematic diagram of another data transmission system according to an embodiment of the present invention.

An embodiment of the present invention further provides a data transmission system. As shown in FIG. 16, the system includes UE 1601 shown in FIG. 13 and a base station 1602 shown in FIG. 15, where the UE 1601 is configured to select a preamble sequence, and acquire an uplink time-frequency resource and a downlink time-frequency resource that are corresponding to the preamble sequence; and send the preamble sequence to the base station 1602; the base station 1602 is configured to receive a preamble sequence sent by the user equipment UE 1601; decode the preamble sequence; and if the decoding succeeds, determine, according to the decoded preamble sequence, the uplink time-frequency resource and the downlink time-frequency resource that are corresponding to the decoded preamble sequence; and send decoding response information to the UE 1601 by using the downlink time-frequency resource, where the decoding response information is used to indicate that the base station 1602 successfully decodes the preamble sequence; the UE 1601 is further configured to: when the decoding response information sent from the base station 1602 is received by using the downlink time-frequency resource, send a data packet to the base station 1602 by using the uplink time-frequency resource corresponding to the preamble sequence; and the base station 1602 is further configured to receive, by using the uplink time-frequency resource, the data packet sent by the UE 1601.

In the data transmission system provided in the present invention, the UE 1601 can locally acquire an uplink time-frequency resource and a downlink time-frequency resource that are corresponding to the preamble sequence, and when receiving decoding response information sent from the base station 1602, the UE 1601 directly sends a data packet to the base station 1602 by using the uplink time-frequency resource. In the prior art, the step of acquiring the time-frequency resources that are corresponding to the preamble sequence is implemented by the base station 1602; the base station 1602 needs to send, to the UE 1601 in a random access response, a series of information about the time-frequency resources that are corresponding to the preamble sequence, and then the UE 1601 acquires the time-frequency resources, which increases a signaling amount. Further, in the prior art, the base station 1602 needs to perform synchronization and conflict resolution with the UE 1601, and multiple pieces of signaling are generated in these two steps. In the present invention, the UE 1601 can locally acquire the time-frequency resources, thereby avoiding signaling overheads during a random response process in the prior art. In addition, the UE 1601 can determine, according to the decoding response information sent from the base station 1602, that the UE 1601 synchronizes with the base station 1602 and there is no conflict, thereby further reducing signaling overheads during a random access process and improving transmission efficiency. The base station 1602 can decode a preamble sequence sent by the UE 1601; determine, according to the decoded preamble sequence, an uplink time-frequency resource used by the UE 1601 to upload a data packet and a downlink time-frequency resource used by the UE 1601 to receive a decoding response message; and receive, by using the uplink time-frequency resource, the data packet sent by the UE 1601. In the prior art, the base station 1602 needs to send information about a time-frequency resource to the UE 1601 in a random access response; the base station 1602 further needs to establish a synchronous connection with the UE 1601, and send a conflict resolution message to the UE 1601, and then the UE 1601 determines that a data packet can be sent, which generates a large number of signaling overheads. In the present invention, because the UE 1601 can determine the uplink time-frequency resource and the downlink time-frequency resource, system overheads can be reduced, and transmission efficiency can be improved.

It may be clearly understood by a person skilled in the art that, for the purpose of convenient and brief description, division of the foregoing function modules is used as an example for illustration. In actual application, the foregoing functions can be allocated to different function modules for implementation according to requirements, that is, an inner structure of an apparatus is divided into different function modules to implement all or a part of the functions described above. For a detailed working process of the foregoing system, apparatus and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data transmission method comprising:
   selecting, by a user equipment (UE), a first preamble sequence; acquiring a first uplink time-frequency resource and a first downlink time-frequency resource that correspond to the first preamble sequence;
   sending the first preamble sequence to a base station, wherein the base station decodes the first preamble sequence and determines, according to the first decoded preamble sequence, the first uplink time-frequency resource and the first downlink time-frequency resource that correspond to the first decoded preamble sequence; and
   when a decoding response information sent from the base station being received by using the first downlink time-frequency resource, sending a data packet to the base station by using the first uplink time-frequency resource, wherein the decoding response information is used to indicate that the base station successfully decodes the first preamble sequence.

2. The data transmission method according to claim 1, wherein the step of acquiring the first uplink time-frequency resource corresponding to the first preamble sequence comprises acquiring, from a pre-stored first correspondence set, the first uplink time-frequency resource corresponding to the first preamble sequence, wherein the first correspondence set is used to indicate a correspondence between at least one preamble sequence and a corresponding uplink time-frequency resource.

3. The data transmission method according to claim 2, wherein the step of acquiring the first downlink time-frequency resource corresponding to the first preamble sequence comprises acquiring, from a pre-stored second correspondence set, the first downlink time-frequency resource corresponding to the first preamble sequence, wherein the second correspondence set is used to indicate a correspondence between at least one preamble sequence and a corresponding downlink time-frequency resource.

4. The data transmission method according to claim 1, wherein the step of acquiring the first uplink time-frequency resource corresponding to the first preamble sequence comprises acquiring, from the first correspondence set sent from the base station, the first uplink time-frequency resource corresponding to the first preamble sequence.

5. The data transmission method according to claim 4, wherein the step of acquiring the first downlink time-frequency resource corresponding to the first preamble sequence comprises acquiring, from a pre-stored second correspondence set, the first downlink time-frequency resource corresponding to the first preamble sequence, wherein the second correspondence set is used to indicate a correspondence between at least one preamble sequence and a corresponding downlink time-frequency resource.

6. The data transmission method according to claim 1, wherein after the sending the preamble sequence to the base station, the data transmission method further comprises:
  responsive to the decoding response information sent from the base station not being received within a first preset duration by using the first downlink time-frequency resource corresponding to the first preamble sequence, reselecting, by the UE, a second preamble sequence after a second preset duration, and acquiring a second uplink time-frequency resource and a second downlink time-frequency resource that correspond to the second preamble sequence; and
  sending the second preamble sequence to the base station, so that the base station decodes the second preamble sequence, and determines, according to the second decoded preamble sequence, the second uplink time-frequency resource and the second downlink time-frequency resource that correspond to the second decoded preamble sequence.

7. The data transmission method according to claim 1, wherein after the step of sending the data packet to the base station, the data transmission method further comprises:
  responsive to acknowledgement information sent from the base station not being received within a third preset duration, reselecting, by the UE, a second preamble sequence after a fourth preset duration, and acquiring a second uplink time-frequency resource and a second downlink time-frequency resource that correspond to the second preamble sequence; and
  sending the second preamble sequence to the base station, so that the base station decodes the second preamble sequence, and determines, according to the second decoded preamble sequence, the second uplink time-frequency resource and the second downlink time-frequency resource that correspond to the second decoded preamble sequence, wherein the acknowledgement information is used to indicate that the base station already successfully receives the data packet sent by the UE.

8. A data transmission method, comprising:
  receiving, by a base station, a first preamble sequence sent by a user equipment (UF); decoding the first preamble sequence;
  determining, according to the first decoded preamble sequence, a first uplink time-frequency resource and a first downlink time-frequency resource that correspond to the first decoded preamble sequence; p1 sending decoding response information to the by using the first downlink time-frequency resource, wherein the decoding response information is used to indicate that the base station successfully decodes the first preamble sequence; and
  receiving, by using the first uplink time-frequency resource, a data packet sent by the UE.

9. The data transmission method according to claim 8, wherein before the step of receiving the first preamble sequence sent by UE, the method further comprises sending a first correspondence set to the UE, wherein the first correspondence set is used to indicate a correspondence between the first preamble sequence and the first uplink time-frequency resource, so that the UE determines the first uplink time-frequency resource according to the first correspondence set.

10. The data transmission method according to claim 8, wherein after the step of receiving the data packet sent by the UE, the data transmission method further comprises responsive to the data packet being successfully received, sending acknowledgement information to the UE, wherein the acknowledgement information is used to indicate that the base station successfully received the data packet.

11. A user equipment (UE), comprising:
  a processor and a non-transitory computer readable medium connected to the processor and having stored thereon instructions that, when executed, cause the processor:
  to select a first preamble sequence from a preamble sequence set, and acquire, according to a correspondence set and the selected first preamble sequence, a first uplink time-frequency resource and a first downlink time-frequency resource that correspond to the first preamble sequence;
  a transmitter, configured to send the first preamble sequence acquired by the processor to a base station, so that the base station decodes the first preamble sequence and determines, according to the first decoded preamble sequence, the first uplink time-frequency resource and the first downlink time-frequency resource that correspond to the first decoded preamble sequence; and
  a receiver, configured to receive, by using the first downlink time-frequency resource, decoding response information sent from the base station;
  wherein the decoding response information is used to indicate that the base station successfully decodes the first preamble sequence; and
  wherein the transmitter is further configured to, when the receiver receives the decoding response information sent from the base station, send a data packet to the base station by using the first uplink time-frequency resource corresponding to the first preamble sequence.

12. The UE according to claim 11, wherein the non-transitory computer readable medium is configured to store sets of correspondences between the first preamble sequence and the first uplink time-frequency resource and between the first preamble sequence and the first downlink time-frequency resource, and a preamble sequence set, wherein the non-transitory computer readable medium is further configured to pre-store a first correspondence set,
  wherein the first correspondence set is used to indicate a correspondence between the first preamble sequence and the first uplink time-frequency resource;
  the processor is further configured to acquire, from the first correspondence set pre-stored by the non-transitory computer readable medium, the first uplink time-frequency resource corresponding to the first preamble sequence;

the receiver is further configured to receive the first correspondence set sent from the base station;

the processor is further configured to acquire, from the first correspondence set received by the receiver, the first uplink time-frequency resource corresponding to the first preamble sequence;

the non-transitory computer readable medium is further configured to pre-store a second correspondence set, wherein the second correspondence set is used to indicate a correspondence between the first preamble sequence and the first downlink time-frequency resource; and the processor is further configured to acquire, from the second correspondence set pre-stored by the memory, the first downlink time-frequency resource corresponding to the first preamble sequence.

13. The UE according to claim 11, wherein the processor is further configured to: when the receiver has not received, within a first preset duration by using the first downlink time-frequency resource corresponding to the first preamble sequence, the decoding response information sent from the base station, reselect a second preamble sequence after a second preset duration.

14. The UE according to claim 11, wherein the receiver is further configured to receive acknowledgement information sent from the base station, wherein the acknowledgement information is used to indicate that the base station already successfully receives the data packet sent by the UE; and the processor is further configured to: when the receiver has not received, within a third preset duration, the acknowledgement information sent from the base station, reselect a second preamble sequence after a fourth preset duration.

15. A base station comprising:
a receiver, configured to receive a first preamble sequence sent by a user equipment(UE);
a processor and a non-transitory computer readable medium connected to the processor and having stored thereon instructions that, when executed, cause the processor to decode the first preamble sequence received by the receiver, and when the decoding succeeds, determine, according to the first decoded preamble sequence and a correspondence set, a first uplink time-frequency resource and a first downlink time-frequency resource that correspond to the first decoded preamble sequence; and
a transmitter, configured to send decoding response information to the UE according to the first downlink time-frequency resource determined by the processor, wherein the decoding response information is used to indicate that the base station successfully decodes the first preamble sequence;
wherein the receiver is further configured to receive, by using the first uplink time-frequency resource determined by the processor, a data packet sent by the UE.

16. The base station according to claim 15, wherein the non-transitory computer readable medium is configured to store sets of correspondences between the first preamble sequence and the first uplink time-frequency resource and between the first preamble sequence and the first downlink time-frequency resource, and a preamble sequence set.

17. The base station according to claim 15, wherein the transmitter is further configured to send a first correspondence set to the UE, wherein the first correspondence set is used to indicate a correspondence between the first preamble sequence and the first uplink time-frequency resource, so that the UE determines the first uplink time-frequency resource according to the first correspondence set.

18. The base station according to claim 15, wherein the transmitter is further configured to send acknowledgement information to the UE when the receiver successfully receives the data packet, wherein the acknowledgement information is used to indicate that the base station already successfully receives the data packet.

19. A data transmission system, comprising:
a user equipment (UE); and a base station;
wherein the UE is configured to select a preamble sequence, to acquire an uplink time-frequency resource and a downlink time-frequency resource that correspond to the preamble sequence, and to send the preamble sequence to the base station;
wherein the base station is configured to receive the preamble sequence sent by the UE, decode the preamble sequence, to determine, according to the decoded preamble sequence, the uplink time-frequency resource and the downlink time-frequency resource that correspond to the decoded preamble sequence, and to send decoding response information to the UE by using the downlink time-frequency resource, wherein the decoding response information is used to indicate that the base station successfully decodes the preamble sequence;
wherein the UE is further configured to, when the decoding response information sent from the base station is received by using the downlink time-frequency resource, send a data packet to the base station by using the uplink time-frequency resource corresponding to the preamble sequence; and
wherein the base station is further configured to receive, by using the uplink time-frequency resource, the data packet sent by the UE.

* * * * *